United States Patent [19]
Chapman

[11] Patent Number: 5,492,353
[45] Date of Patent: Feb. 20, 1996

[54] WHEEL SUSPENSION FOR A CAMERA DOLLY

[75] Inventor: Leonard T. Chapman, North Hollywood, Calif.

[73] Assignee: Leonard Studio Equipment, Inc., North Hollywood, Calif.

[21] Appl. No.: 97,265

[22] Filed: Jul. 23, 1993

Related U.S. Application Data

[63] Continuation-in-part of Ser. No. 761,178, Sep. 16, 1991, abandoned, which is a continuation-in-part of Ser. No. 591,524, Oct. 1, 1990, Pat. No. 5,174,593.

[51] Int. Cl.⁶ ........................................................ B60P 3/00
[52] U.S. Cl. ...................... 280/111; 280/47.11; 301/36.2; 301/127
[58] Field of Search .................... 280/47.11, 400, 280/112.2, 772, 79.11, 6.11, 111, 661; 188/282, 319, 322.15, 316; 301/127, 131, 126, 36.1, 36.2, 124.1; 295/8.5

[56] References Cited

U.S. PATENT DOCUMENTS

| | | | |
|---|---|---|---|
| 1,149,153 | 8/1915 | Schleicher | 301/127 |
| 2,933,327 | 4/1960 | Benson et al. | 280/111 |
| 3,342,507 | 9/1967 | Koch et al. | 280/661 |
| 4,003,584 | 1/1977 | Zelli | 280/91 |
| 4,603,868 | 8/1986 | Schutz | 301/127 |
| 4,943,101 | 7/1990 | Chapman | 301/36.1 |
| 4,950,126 | 8/1990 | Fabiano et al. | 280/47.11 |
| 5,088,662 | 2/1992 | Appleberry | 301/127 |

OTHER PUBLICATIONS

LSE Crab Crane Rocker Design illustration.
Vinten Fulmar Pedestal Rocker Design illustration.
J. L. Fisher Inc. Model 9 Camera Dolly Optional Accessories brochure.

*Primary Examiner*—Eric D. Culbreth
*Attorney, Agent, or Firm*—Lyon & Lyon

[57] ABSTRACT

A camera dolly has a steering compensator including offset shaft sections and drive members rotationally displaceable from each other. The steering compensator provides steering angle correction in conventional steering wherein the front wheels of the dolly remain fixed straight ahead and the rear wheels steer. A crab-conventional camera dolly steering shift mechanism uses shift plates and sprockets on a vertical axle to shift between crab and conventional steering modes. An electronic shifter, provided as an accessory, automatically shifts between crab and conventional steering modes. A rocker suspension for the wheels of the camera dolly reduces undesired movement of the dolly, and of a camera mounted on the dolly, when the dolly wheels encounter a bump or obstruction. A bogey wheel system improves the performance of the rocker suspension by offsetting the wheels of the dolly dual wheel sets.

9 Claims, 30 Drawing Sheets

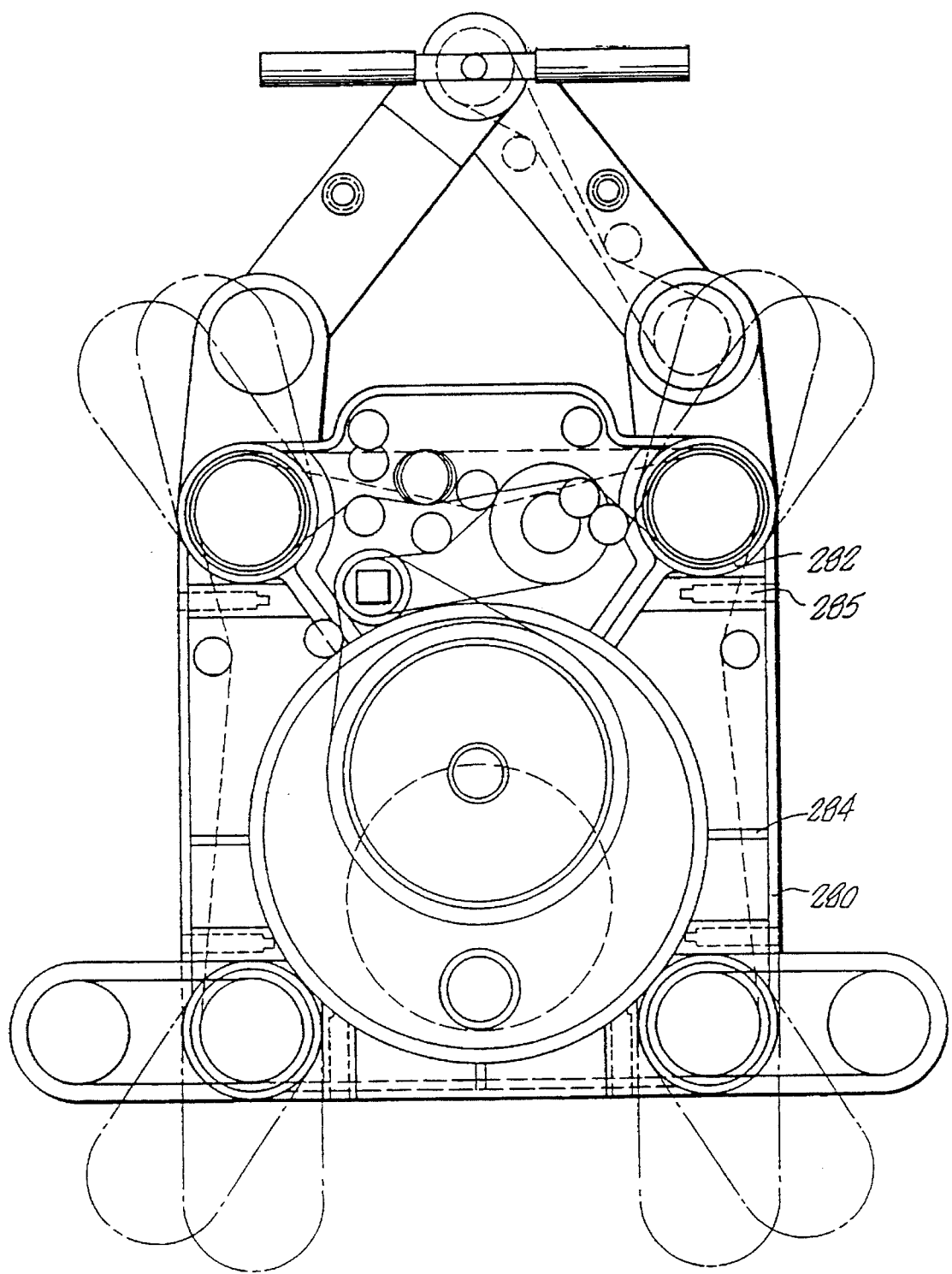
FIG_8

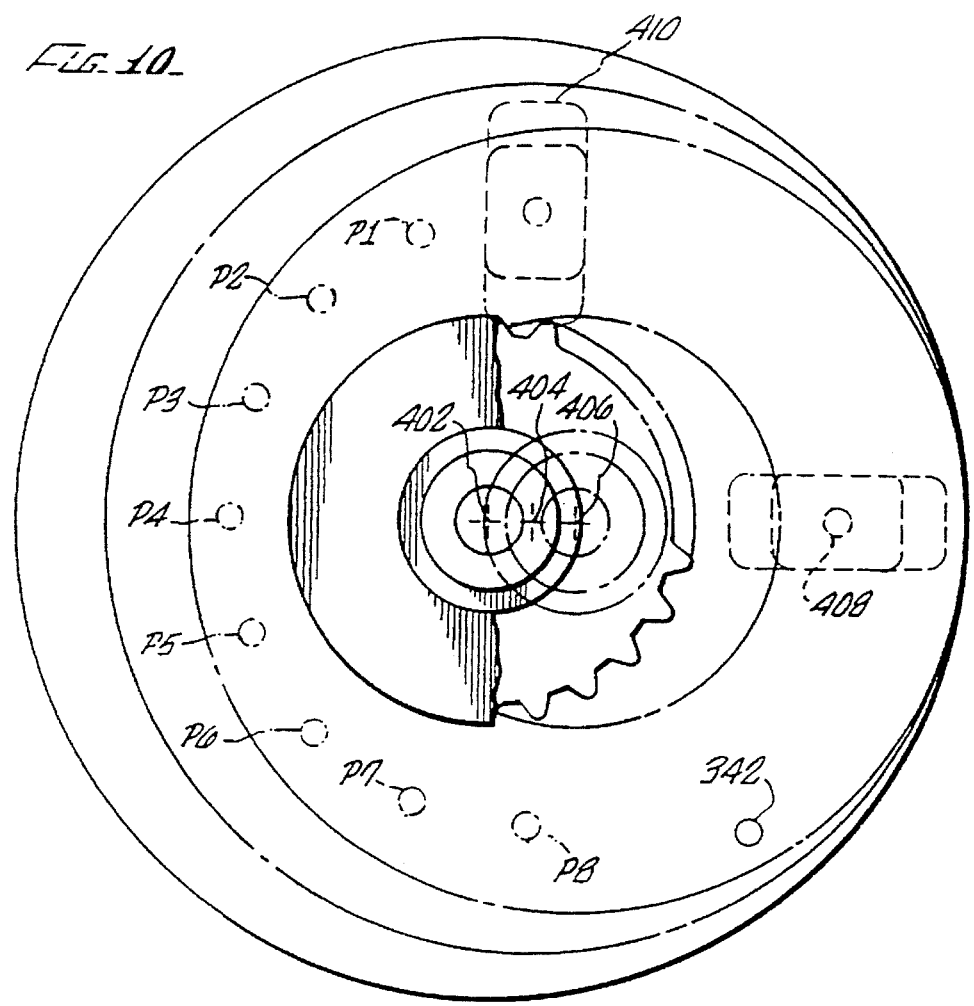
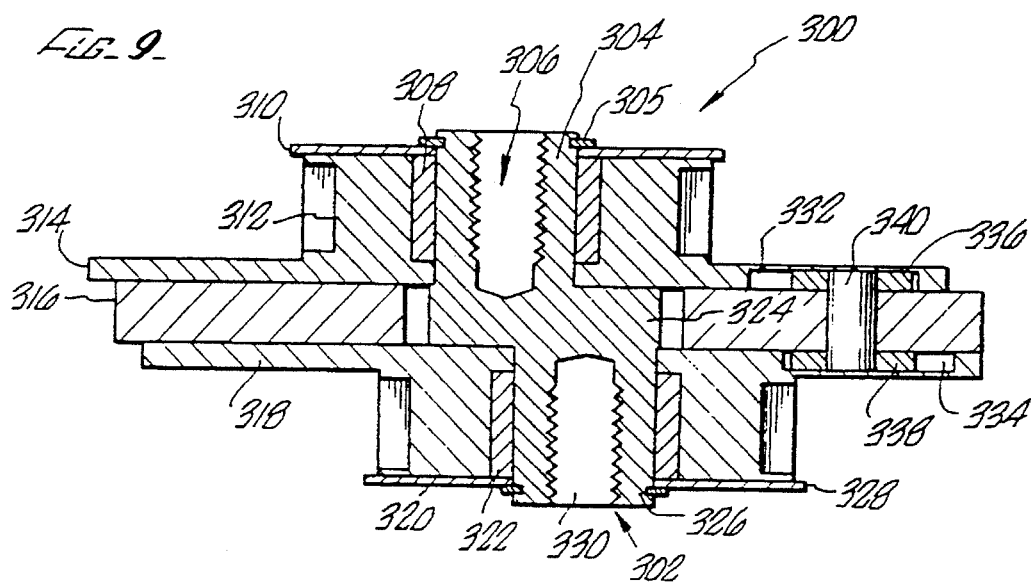

TABLE 1

| r = | 131.00 | 61.00 | 30.50 | 15.25 | 7.62 | 0.0 | -5.04 | -10.079 |
|---|---|---|---|---|---|---|---|---|
| a = | 14.04 | 28.24 | 47.04 | 65.04 | 76.91 | 90.00 | 98.75 | 107.10 |
| b = | 12.23 | 21.98 | 32.89 | 42.77 | 49.70 | 58.39 | 65.23 | 72.90 |

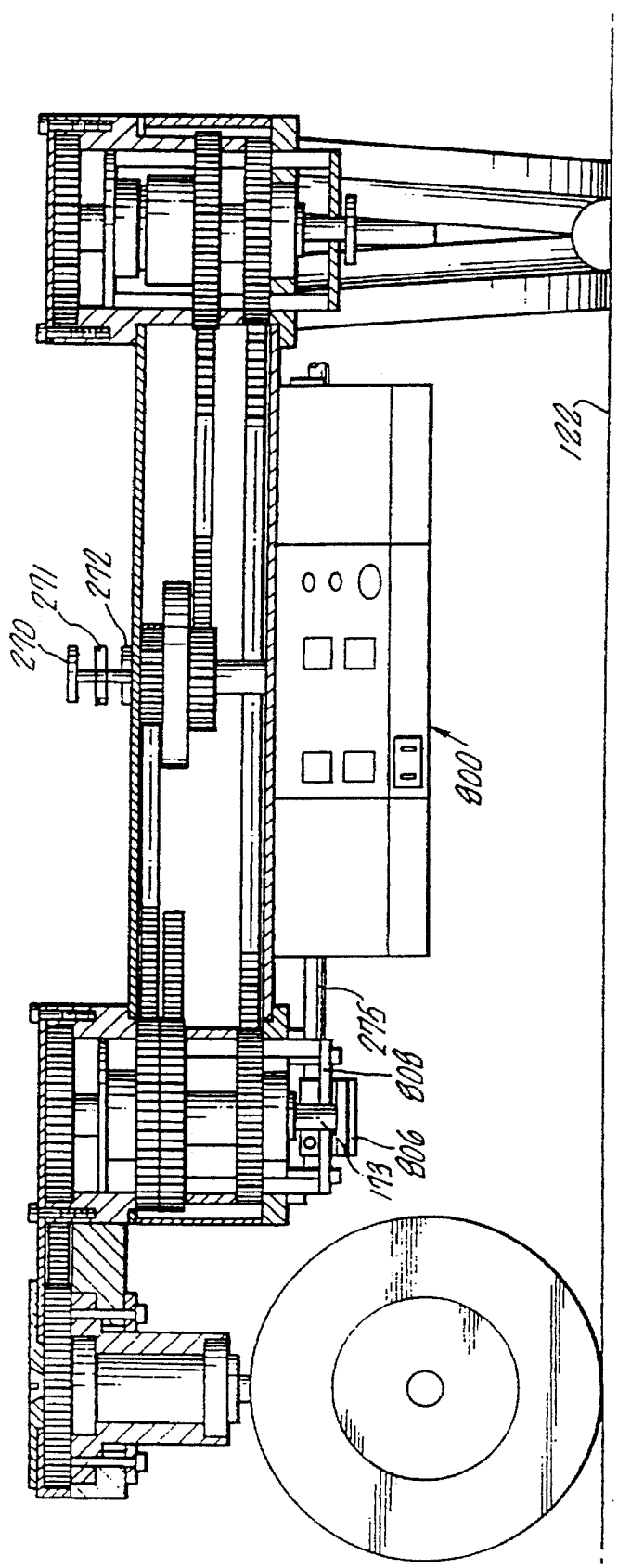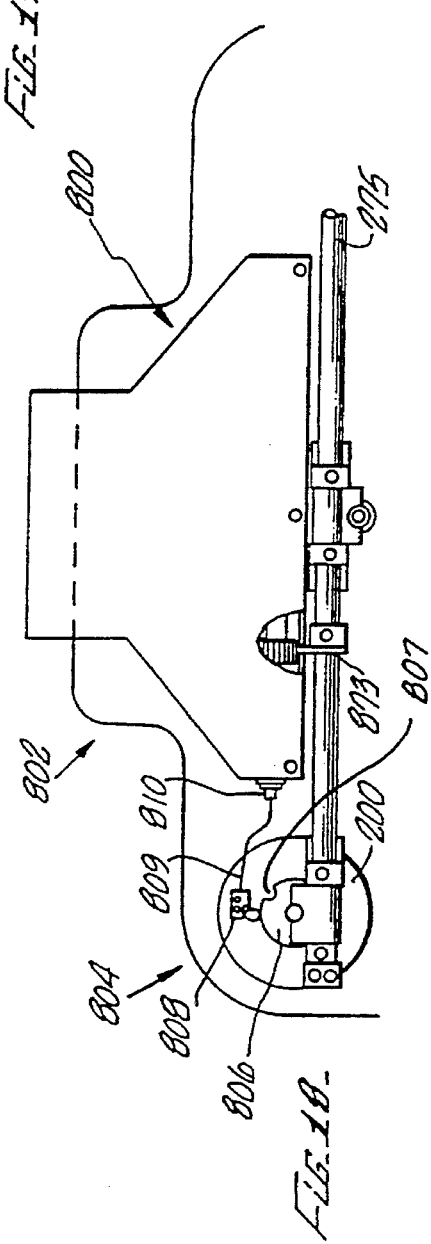
FIG. 17.
FIG. 18.

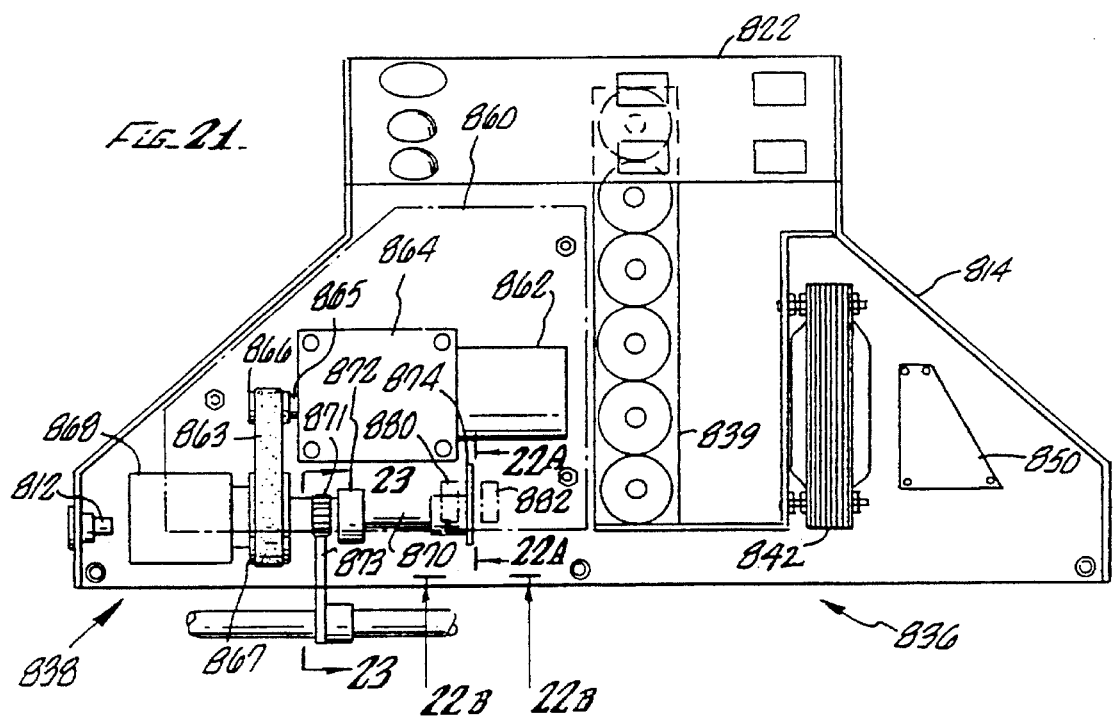
FIG. 21.
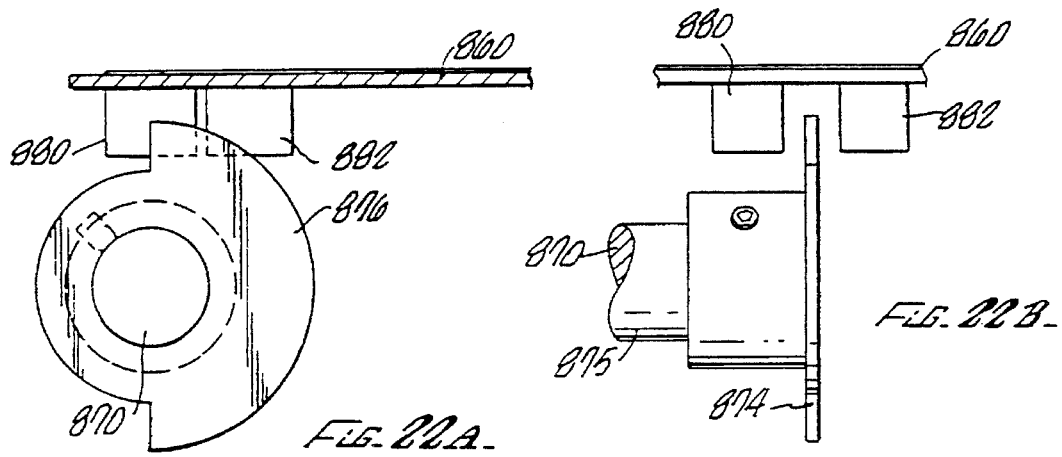
FIG. 22A.
FIG. 22B.
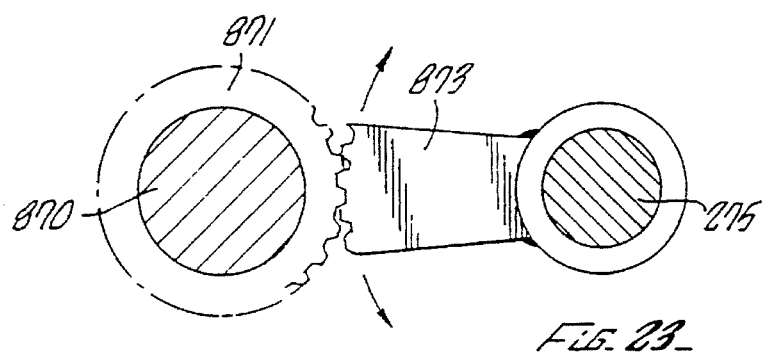
FIG. 23.

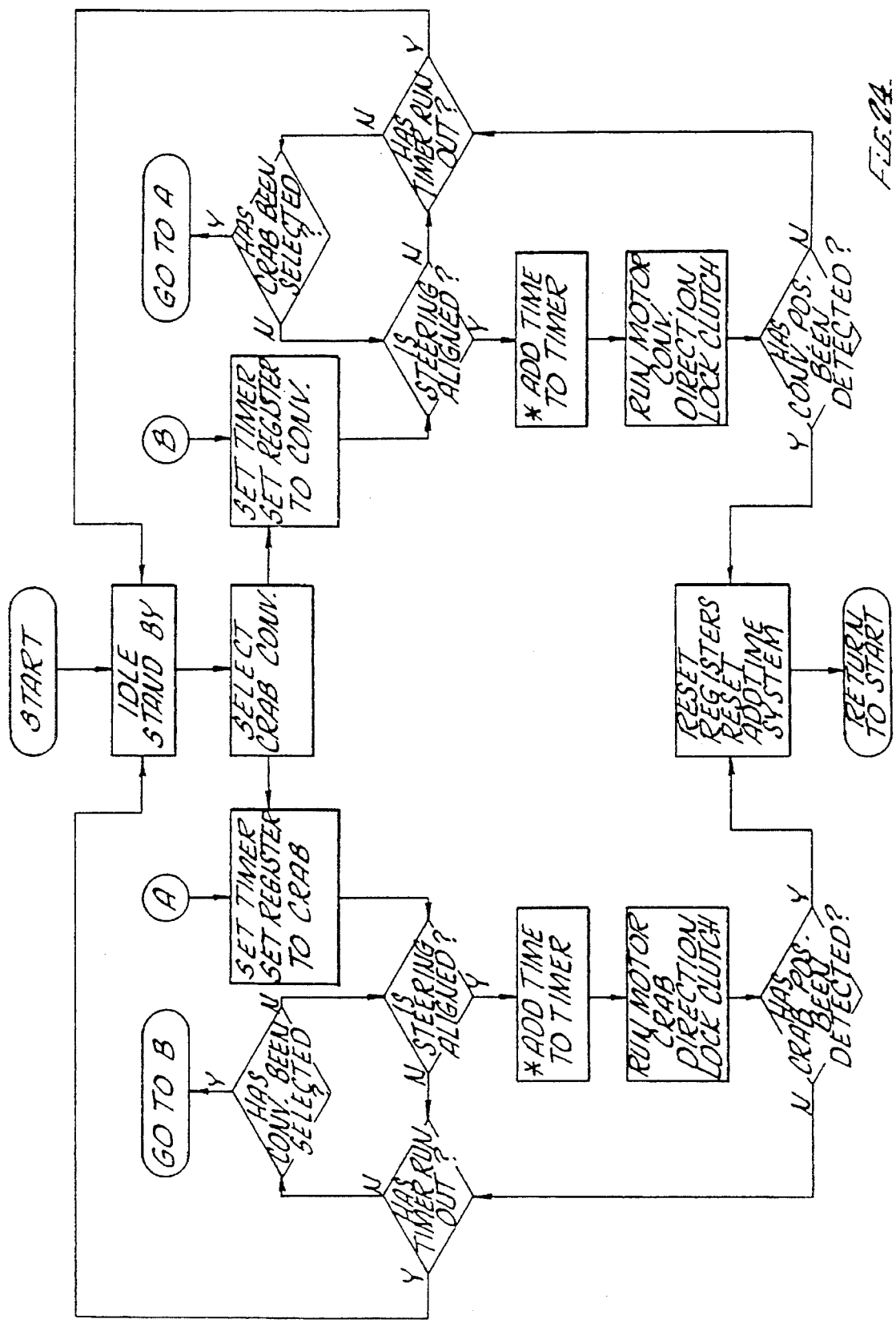

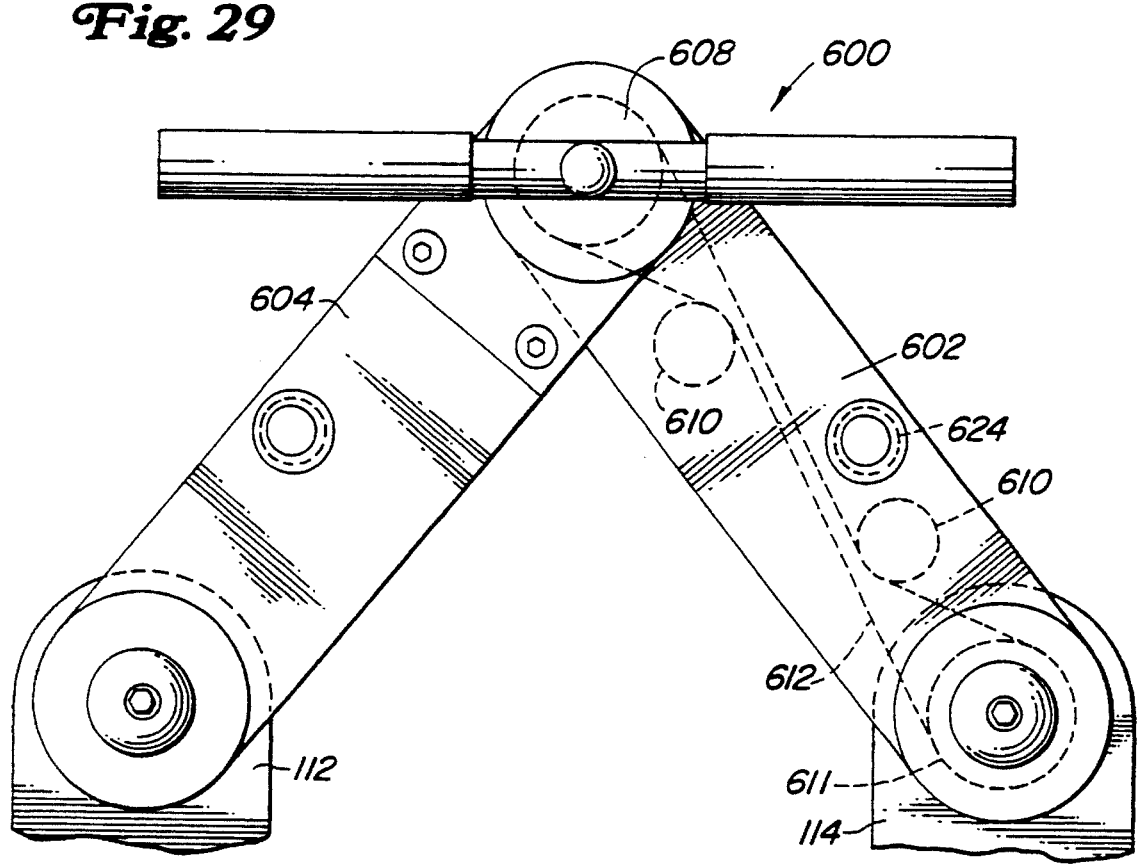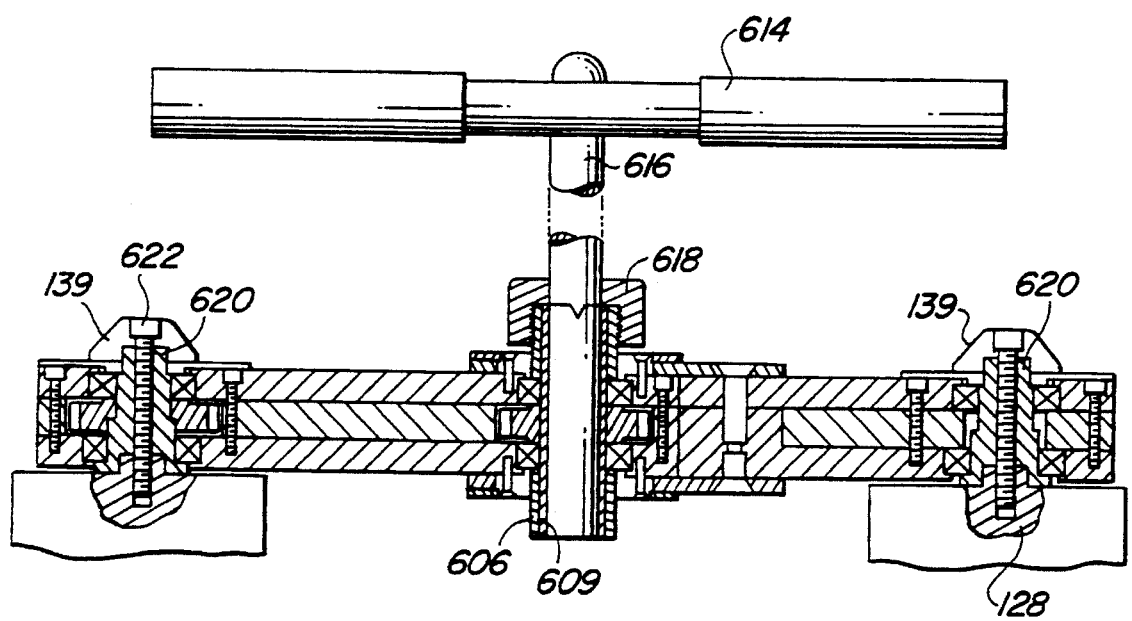

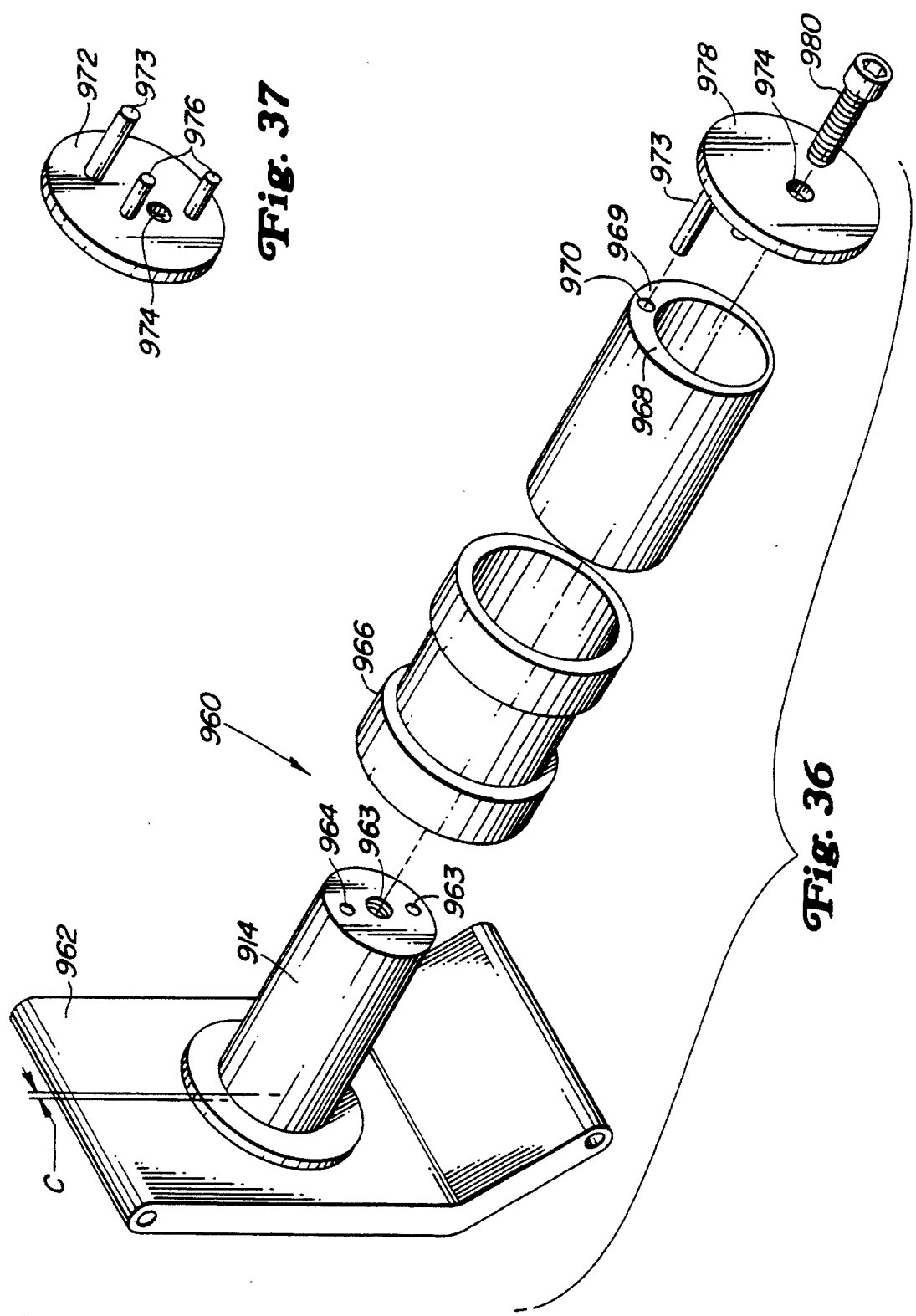

WHEEL SUSPENSION FOR A CAMERA DOLLY

This application is a continuation-in-part of my U.S. patent application Ser. No. 07/761,178 filed Sep. 16, 1991 and now abandoned, which in turn is a continuation-in-part of my U.S. patent application Ser. No. 07/591,524 filed on Oct. 1, 1990 and now U.S. Pat. No. 5,174,593, each incorporated herein by reference.

BACKGROUND OF THE INVENTION

The application relates to the field of mobile wheeled equipment and specifically to camera dollies or pedestals used in the television and motion picture industries. In the production of television programs or motion pictures, it is often necessary to maneuver a camera between different filming positions. The required camera movement may include elevating and lowering the camera as well lateral and longitudinal movement between the camera and subject. Continuous translation of the camera, i.e., to follow an action or moving sequence is also occasionally called for. Camera cranes and dollies are employed to support the camera and perform the desired camera movement.

For filming in close quarters, a compact camera dolly is desired. For example, to fit through narrow doorways, the length and width of the camera dolly should be limited. With the advent of widespread "on location" filming, the camera dolly may have to be hand carried, e.g., up narrow stairways, across uneven outdoor terrain, etc. Accordingly, it is desirable for the camera dolly to be lightweight and easily carried.

It is important for the camera dolly to provide a stable platform for the camera, both at rest and when moving, since any shock, vibrations, jarring or rocking imparted by the dolly will cause the recorded film or video image sequence to "jump" unacceptably. Consequently, the dolly structure must be rigid and secure. The camera dolly should preferably also be capable of readily supporting not only a camera of substantial weight, but also a camera operator and a second individual such as a cinematographer, director, lighting specialist, etc. Preferably, the camera dolly is able to quickly, but silently and smoothly translate, rotate and elevate the camera. Quiet operation of all aspects of dolly movement, such as rolling, steering, turning and elevating or lowering a camera is especially important during the production of live television wherein even intermittent low or muffled equipment noise can be disruptive.

For added versatility, the camera dolly should be capable of both conventional steering and crab steering.

In conventional steering, the front wheels remain fixed and the rear wheels steer. In crab steering, all of the dolly wheels are steered together, thereby permitting the dolly to be moved in any direction. In certain filming sequences, it is necessary to shift between conventional and crab steering modes. This shifting must be performed quickly and smoothly. In addition, the camera dolly operators or dolly grips must continue to smoothly push the dolly while steering mode shifting is made, during a filming sequence. This can be difficult because lifting has heretofore required a free arm or leg to actuate a shift handle or lever and because shifting can only occur when the wheels are properly aligned.

In conventional steering, to maintain acceptable steering performance while the dolly is steered on a curved path, a conventional steering corrector or transmission is required. See, for example, U.S. Pat. No. 4,003,584 to Zelli. The corrector adjusts the steering angle of the camera dolly wheels to allow the camera dolly to properly track a curved path. This prevents any scraping or scrubbing of the wheels against the floor or supporting surface which would tend to vibrate and disturb the camera and filming sequence as well as increasing rolling friction or resistance.

For translational filming sequences over uneven surfaces, for example on outdoor terrain, track can be laid to provide a smoother rolling surface for the camera dolly. The camera dolly should accordingly be able to quickly and easily be set up for use on track.

Both 3-wheel and 4-wheel camera dollies or 3-corner pedestals have been proposed and used in the past (generally having dual wheels at each corner). Three-wheel configurations are advantageous as they are stable, i.e., a tripod configuration, even on uneven ground. However, three-wheel dollies or pedestals are not well suited for operation on track or allowing for passage through narrow doorways without incurring unacceptable levels of "tilt line" stability. Four-wheel camera dollies can perform well on track and have much larger wheelbase ranges but can be less stable than three-wheel units. For example, a slight bump under a wheel of a four-wheel unit can cause it to rock or tip slightly (due to one corner of the vehicle losing contact with the ground). This results in poor "tilt line" performance, whereas a three-wheel unit would be largely unaffected because all corners maintain ground contact. Consequently, heretofore, there have been tradeoffs to be weighed in selecting a three-wheel or a four-wheel design.

Frequently, a camera dolly carrying a television camera will be used on a sound stage. The dolly wheels often roll over bumps on the stage floor, such as, e.g., carpeting edges, etc. On track, the dolly wheels will encounter bumps in between misaligned track sections. Advantageously, the camera dolly should include a mechanism for reducing the disturbance caused by such imperfections on the rolling surface.

Accordingly, an object of the invention is to provide a camera dolly having improved conventional steering performance.

It is yet another object of the invention to provide such a dolly which is relatively lightweight and portable yet which provides a stable and secure camera platform.

It is still another object of the invention to provide a combination camera dolly/pedestal having a separable pedestal which can be removed and used apart from the dolly.

It is yet another object of the invention to provide an electronic steering mode shifter for automatically shifting between conventional steering and crab steering in a camera dolly.

It is yet a further object of the invention to provide an electronic steering mode shifter for automatically shifting between steering modes and which can be preset to eliminate the need for manually actuating a steering mode shift handle or lever.

It is another object of the invention to provide a novel rocker suspension for the wheels of a camera dolly.

It is another object of the invention to provide a bogey wheel system for improving the performance of the rocker suspension.

Other and further objects and advantages will appear hereinafter.

SUMMARY OF THE INVENTION

To these ends a steering compensator includes a shaft having a first shaft section and a central shaft section offset from the shaft section. A second section of the shaft is offset from the first and central shaft sections. A first drive member is pivotally or rotatably attached to the first shaft section and a second drive member is similarly attached to the second shaft section. A central member is pivotally or rotatably attached to the central shaft section in between the first and second drive members. A pivotal link connects the first and second drive members, through the central member, to allow relative angular displacement between the first and second drive members.

In an adjustable embodiment of the present steering compensator, an eccentric drive collar is rotatably mounted on a first shaft section. A knob or handle attached to the eccentric drive collar is used to shift the adjustable steering compensator between first and second configurations. The first configuration is used when the camera dolly legs are all positioned straight ahead (i.e., the narrowest dolly configuration) and for the 3-point simulation mode (i.e., with the rear dolly legs close together and the front dolly legs spaced apart at a maximum distance, with the front dolly legs perpendicular to the sides of the dolly chassis). With the adjustable steering compensator shifted into its second mode, steering correction is provided when the dolly legs are in the track position (standard track wheel base being 24.56 in width). This may be the selected width for on the floor operation when not on track. (Steering on track is controlled by the track and the corrector is not in operation at that time.)

A manual steering mode shift apparatus for shifting between crab and conventional steering in a camera dolly comprises a housing and a first shift plate slidably supported on a shaft extending through the housing. A second shift plate is slidably supported on the shaft and spaced from the first shift plate. A support is positioned at least partially around the shaft and fixed to the housing. A shift mechanism is provided for reversibly shifting the second shift plate between a crab position and a conventional steering position.

An electronic steering mode shifter includes a detector for detecting a wheel angle position, and a shift mechanism for automatically shifting the dolly steering system between conventional and crab steering. An electronic controller is connected to the detector and to an electric motor driving a drive shaft through a gear reducer and clutch. The drive shaft within the electronic shifter engages a pivot shaft of the camera dolly. The electronic shifter is preferably configured as an accessory or add-on unit with the shifter housing releasably attachable to the camera dolly.

A rocker suspension for the wheels of a camera dolly includes axle support plates on both sides of the kingpin. The axle support plates are pivotally attached to rocker links which in turn are pivotally attached to the kingpin. The rocker suspension reduces unwanted movement of the camera dolly when the dolly wheels encounter a bump or other irregularity on the floor surface.

A bogey wheel system allows the inside and outside wheels of the dual wheel sets of the dolly to be offset slightly from each other in the front to back direction. The offset wheels improve the performance of the rocker suspension.

BRIEF DESCRIPTION OF THE DRAWINGS

Other objects and features of the present invention will become apparent from the following detailed description taken in connection with the accompanying drawings. It is to be understood, however, that the drawings are designed for the purpose of illustration only and are not intended as a definition of the limits of the invention.

In the drawings, wherein similar reference characters denote similar elements throughout the several views:

FIG. 8 is a schematic illustration of the dolly chassis with a steering bracket accessory installed;

FIG. 9 is a section view of the present steering corrector of the camera dolly of FIG. 1;

FIG. 10 is a top view thereof;

FIG. 17 is a rear elevation view in part section showing the electronic shifter accessory attached to the camera dolly;

FIG. 18 is a bottom elevation view fragment also illustrating the electronic shifter attached to the camera dolly;

FIG. 21 is a bottom elevation view of the electronic shifter 10 mounted on the camera dolly, with the shifter housing cover removed;

FIG. 22A is an enlarged end view fragment taken along lines 22A—22A of FIG. 21;

FIG. 22B is an enlarged front elevation view fragment taken along line 22B—22B of FIG. 21;

FIG. 23 is an enlarged side elevation view fragment taken along line 23—23 of FIG. 21;

FIG. 24 is a flow chart illustrating the operation and control logic of the shifter;

FIG. 29 is a top elevation view of a steering bracket accessory attached to the dolly;

FIG. 30 is a partial section view thereof;

FIG. 36 is an exploded partial perspective view of the bogey wheel system of FIG. 35;

FIG. 37 is a perspective view of the inside of the axle cap of FIG. 36;

DETAILED DESCRIPTION OF THE PREFERRED EMBODIMENT

Figure 1:
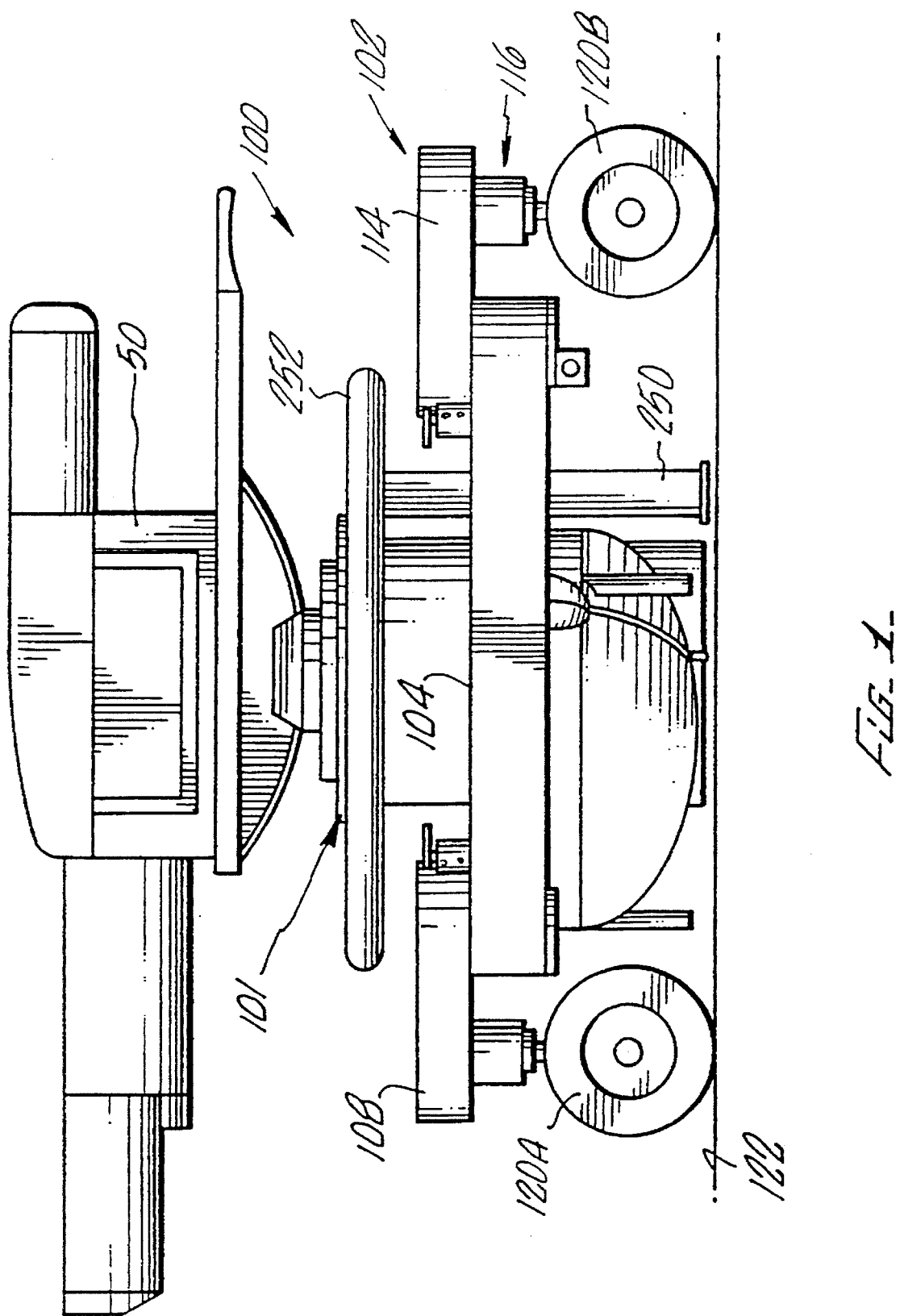
FIG. 1 is a left side elevation view of the present camera dolly including an associated pedestal supporting a camera.

Turning now in detail to the appended drawings, as shown in FIG. 1, a television or motion picture camera 50 is mounted on to a dolly/pedestal unit 100 comprising a dolly 102 and a separable pedestal 101. A description of the pedestal 101 is set forth in my U.S. Pat. No. 5,197,700 and my U.S. patent application Ser. No. 07/761,179 filed Sep. 16, 1991, both of which are fully incorporated herein by reference.

Figure 2:
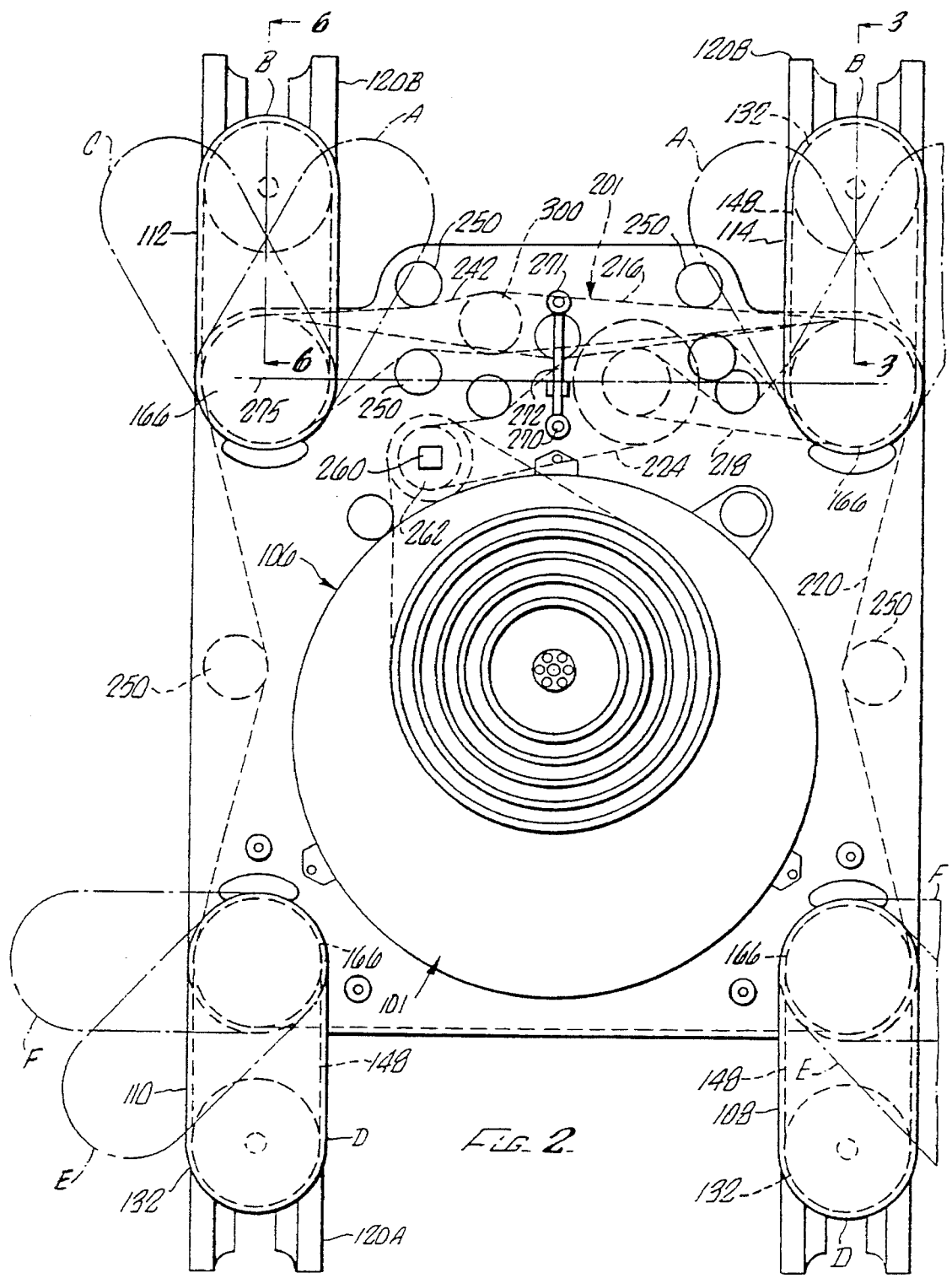
FIG. 2 is a schematically illustrated top view thereof with the camera platform and steering wheel removed and showing the present steering system.

The dolly 102 includes a dolly chassis 104 having a generally round pedestal opening 106 (FIG. 2) extending through the dolly chassis 104 for receiving and supporting the pedestal. Three or four recessed mounting positions with threaded holes are provided around the opening 106 for accepting and securing the pedestal 101 into the dolly 102, while maintaining a flat dolly deck surface. Pivotally attached to the dolly chassis 104 are chassis legs (FIG. 2), described herein as the front left leg 108; the front right leg 110; the rear right leg 112; and the rear left leg 114. As shown in FIG. 2 the rear legs 112 and 114 can be pivoted on the dolly chassis 104 into leg positions A, B, and C. Similarly, the front legs 108 and 110 may be pivoted into leg positions D, E and F. Other leg positions may also be used.

With the rear dolly legs in position B and the front dolly legs in position D, the dolly is in the straight ahead or narrowest width dolly configuration. With the rear dolly legs in position C and the front dolly legs in position E, the dolly is in the track position, i.e., the dolly is configured to roll on standard track having 24.56 centers, i.e., the center lines of the two rails of the standard track are spaced apart by 24.56 inches. With the rear dolly legs in position A and the front dolly legs in position F, the dolly is in a simulated three-point suspension configuration, i.e., the camera dolly approximates a tripod suspension.

Figure 3:
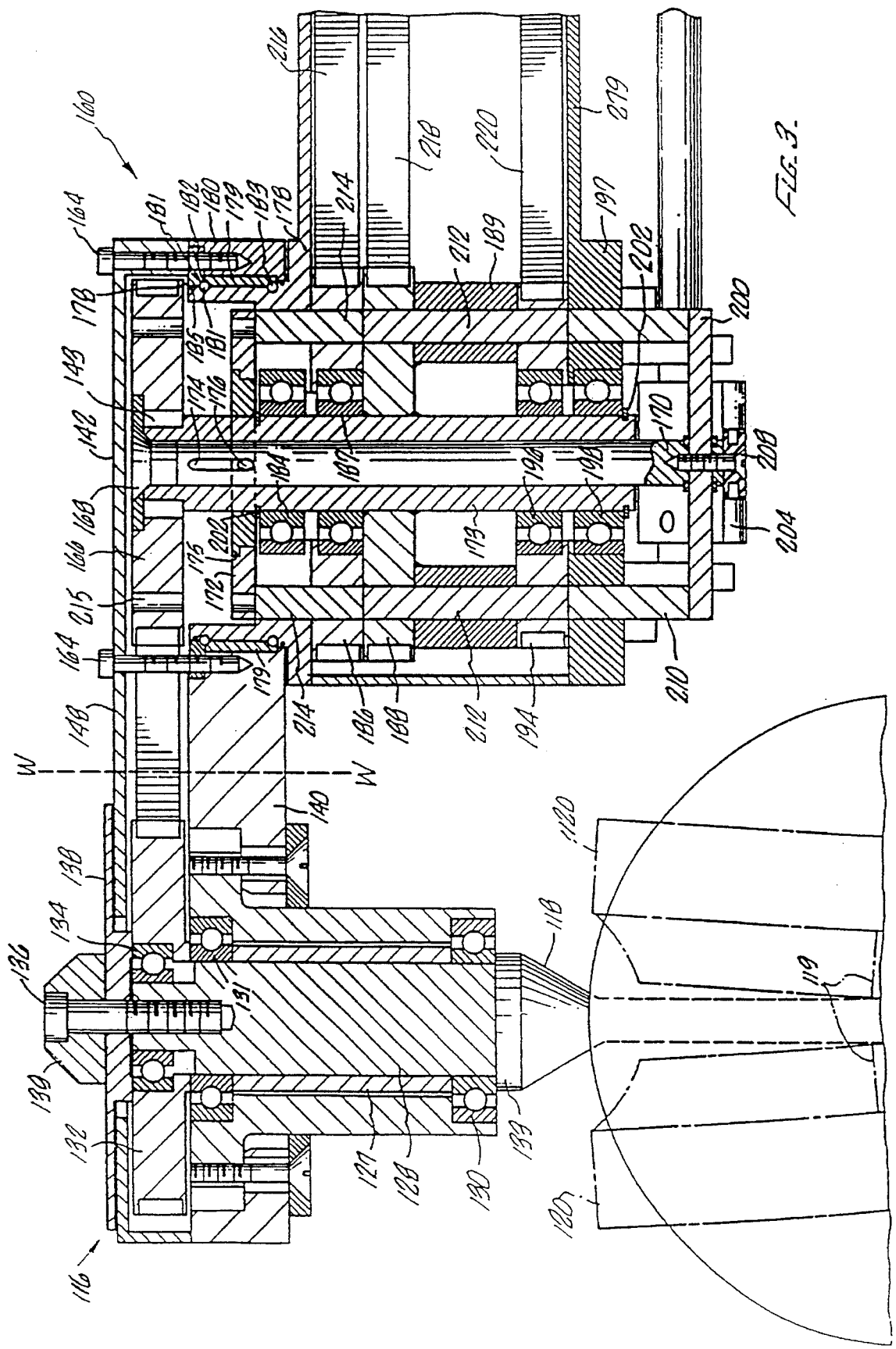
FIG. 3 is a section view fragment of the rear left leg and chassis section of the dolly of FIG. 1 illustrating the present crab-conventional steering shift apparatus.
Figure 5:
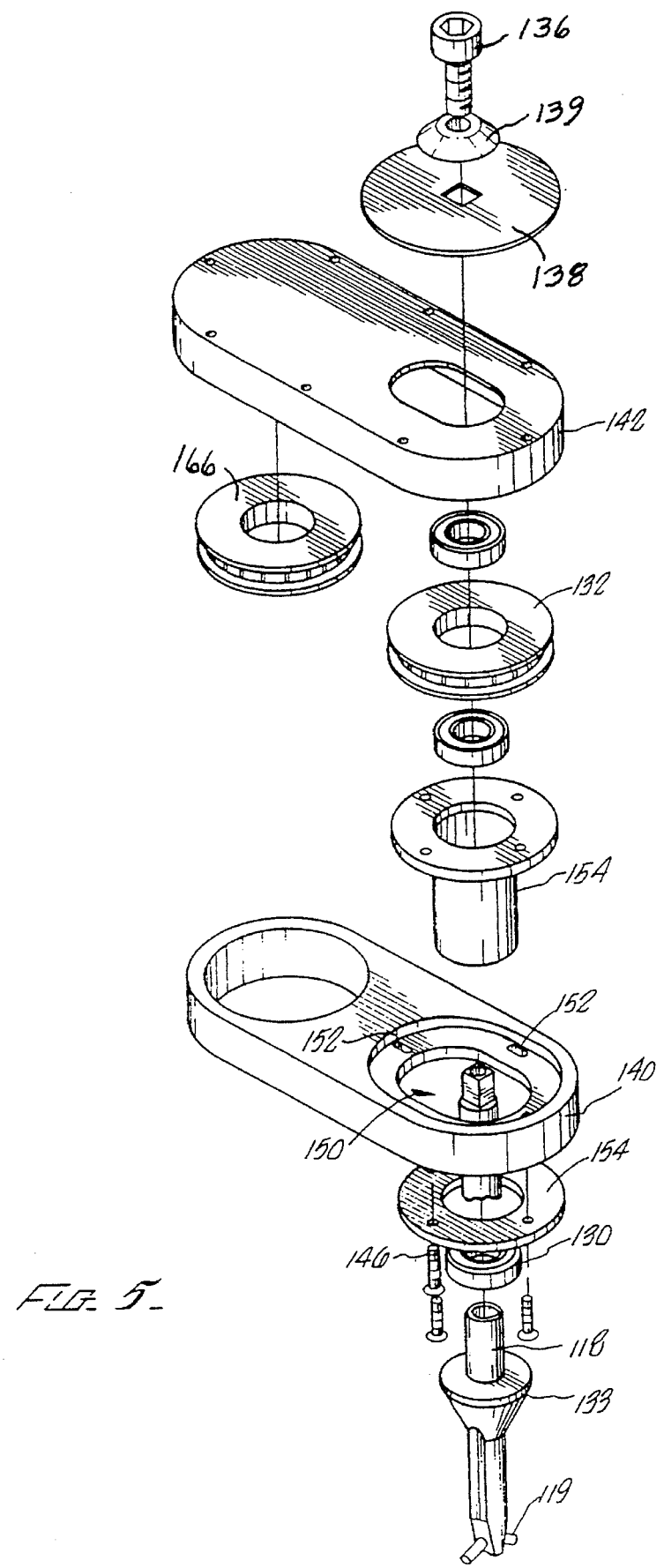
FIG. 5 is an exploded perspective view of a leg of the camera dolly of FIG. 1 illustrating the present adjustable leg belt tensioning apparatus and kingpin.

Referring to FIG. 3, the left rear-wheel king pin assembly 116 is described herein in detail. It will be understood, however, that the other wheel assemblies on the dolly 102 will have similar construction. (The wheel king pin assembly 116 generally comprises the structure to the left of line W—W in FIG. 3.) A king pin 118 includes axles 119 extending at a dihedral angle. Wheels 120 are rotatably mounted on the axles 119. The wheels 120 are configured to roll either on the ground 122 or on a standard industry track rail. A king pin shaft 128 extends through a king pin shaft bearing 130 supported by a king pin ferrule 133. A spacer sleeve 127 spaces apart bearings 130 and 131 separating the bearings slightly more than the housing shoulder dimensions. A king pin sprocket 132 is mounted over a king pin sprocket bearing 134 on the king pin shaft 128. A wheel assembly steering locking bolt 136, preferably a socket head cap screw, extends through a cover plate 138 into a threaded hole in the top end of the king pin shaft 128. Cap 139 bears upon the cover plate 138 held by the locking bolt 136. As shown in FIG. 5, orientation of the plate 138 and its rotation is determined by the square end of the shaft 128 and the corresponding square hole in the plate 138. When the locking bolt 136 is tightened into the king pin shaft 128 the cap 139 causes the cover plate 138 and king pin sprocket 132 to lock against and rotate with the king pin shaft 128. Locking bolt 136 is loosened to align the wheel assembly and then re-tightened.

Specifically, to align the wheel assembly, the wheels are steered to a straight ahead position. The cover plate 138 has three grooves or markings corresponding to the three leg settings. With the locking bolt 136 loosened, the king pin 118 is turned to align the appropriate marking on the cover plate 138 with a reference mark on the upper leg frame 142. The locking bolt 136 is then re-tightened.

Each leg 108, 110, 112 and 114 comprises a lower leg frame 140 and an upper leg frame, 142. As shown in FIG. 5, the lower leg frame 140 has an elongated or oval opening 150 and slotted holes 152 for securing the king pin armature 154 to the lower leg frame 140. The slotted holes 152 allow the king pin armature 154 to be slidably positioned to adjust the appropriate tension in the leg belt 148. The king pin ferrule 133 is clamped into position using clamping bolts 146 after the position of the king pin ferrule 133 has been adjusted for proper tensioning of the leg belts, e.g., belt 148. Spacer sleeve 127 is of correct length to prevent the alignment clamping forces to be placed on the bearing balls thus preventing added friction.

As shown in FIG. 3, in a left shift assembly 160, the upper leg frame 142 is secured to an outer bearing frame 180 by bolts 164 internally lined with a hardened sleeve 179. Within the left steering shift assembly 160 is a leg drive sprocket 166 linked by belt 148 to the king pin sprocket 132 (see FIG. 2 also). A cap screw 168 secures the leg drive sprocket 166 to a tubular axle 173 extending substantially vertically throughout the steering shift assembly 160. Dowel pins 143 finalize the attachment. An upper plate 172 is vertically slidable by way of a slot 174 on the shaft 170 by a pin 176.

A hardened inner bearing frame 178 pivotally supports the leg 114 (and legs 108, 110, and 112) on the dolly chassis 104. The outer bearing frame 180 with the hardened sleeve 179 is fitted over the inner bearing frame 178 to form the bearing to pivotally mount the legs 114. Balls 182 are positioned within upper and lower annular openings 181 and 183 formed by the inner bearing frames 178 and the hardened sleeve 179 on the outer bearing frame 180.

Since the outer bearing frame 180 is a structural member of the dolly, the shift assembly 160 can be made lightweight and compact. Seals 185 maintain lubricant within the bearings and keep contaminants out.

Referring still to FIG. 3, a conventional steering sprocket 186 is rotatably mounted on the axle 173 by a bearing 187. Similarly, a crab sprocket 194 is rotatably mounted on the axle 173 by crab sprocket bearings 196. A shaft drive sprocket 188 is irrotatably mounted on and fixed to the axle 173. A drive sleeve 189 is welded to the drive sprocket 188 to the crab sprocket 194, or the sleeve 189 and sprockets 188 and 194 can be a single piece unit. Plate bearings 184 and 198 support the axle 173 within the inner bearing frame 178 and lower support plate 197. Retaining rings 202 secure the axle 173 vertically within the shift assembly 160 on the inner races of bearings 198 and 184. A lower plate 200 is secured to the lower end of the shaft 170 by cap screw 208. Lower shift pins 210 resting against the lower plate 200 extend through the lower support 197 and butt against middle shift pins 212 which extend through holes in the crab steering sprocket 194 and drive sprocket 188. Upper shift pins 214 rest against the middle shift pins 212 and extend through the conventional steering drive sprocket 186. The upper ends of the upper shift pins 214 are secured to the upper plate 172 which can rotate on a disc 175 that is secured to axle 173 by a pin 176. The shift pins 210, 212 and 214 preferably have tapered ends so that they can drive into and align the sprockets even when the holes in the sprockets are not yet perfectly aligned. This provides a larger "shifting window" in time, for shifting steering modes. As shown in FIG. 3, 2 sets of shift pins are provided 180° apart.

A pivoting fork shift assembly 204 allows the lower plate 200 to be shifted from a lower or crab steering position (as shown in FIG. 3) wherein the middle shift pins 212 cause the drive sprocket 188 to be mechanically linked to the crab steering sprocket 194— to implement crab steering; to a second or conventional steering position wherein the lower plate 200 is shifted upwardly such that the crab sprocket 194 is mechanically linked to the fixed lower support 197 by the lower shift pins 210, and wherein the middle shift pins 212 cause the drive sprocket 18 to link up with and rotate with the conventional steering sprocket 186—to implement conventional steering.

The term "conventional steering" as used herein means the steering mode where the front wheels of the dolly remain fixed straight ahead and the rear wheels turn for steering (or vice versa). Thus, with the shift assembly 160 shifted into the crab steering mode, the drive sprocket 188 turns with the crab sprocket 194, while the conventional steering sprocket 186 remains fixed. On the other hand, with the shift assembly 160 shifted into the conventional steering mode, the crab sprocket 194 remains fixed while the conventional steering sprocket 186 rotates with and is driven by the drive sprocket 188. Poke holes 215 through sprocket 166 and plate 172 allow the shift pins to be pushed out of the shift assembly 160 during maintenance.

Figure 6:
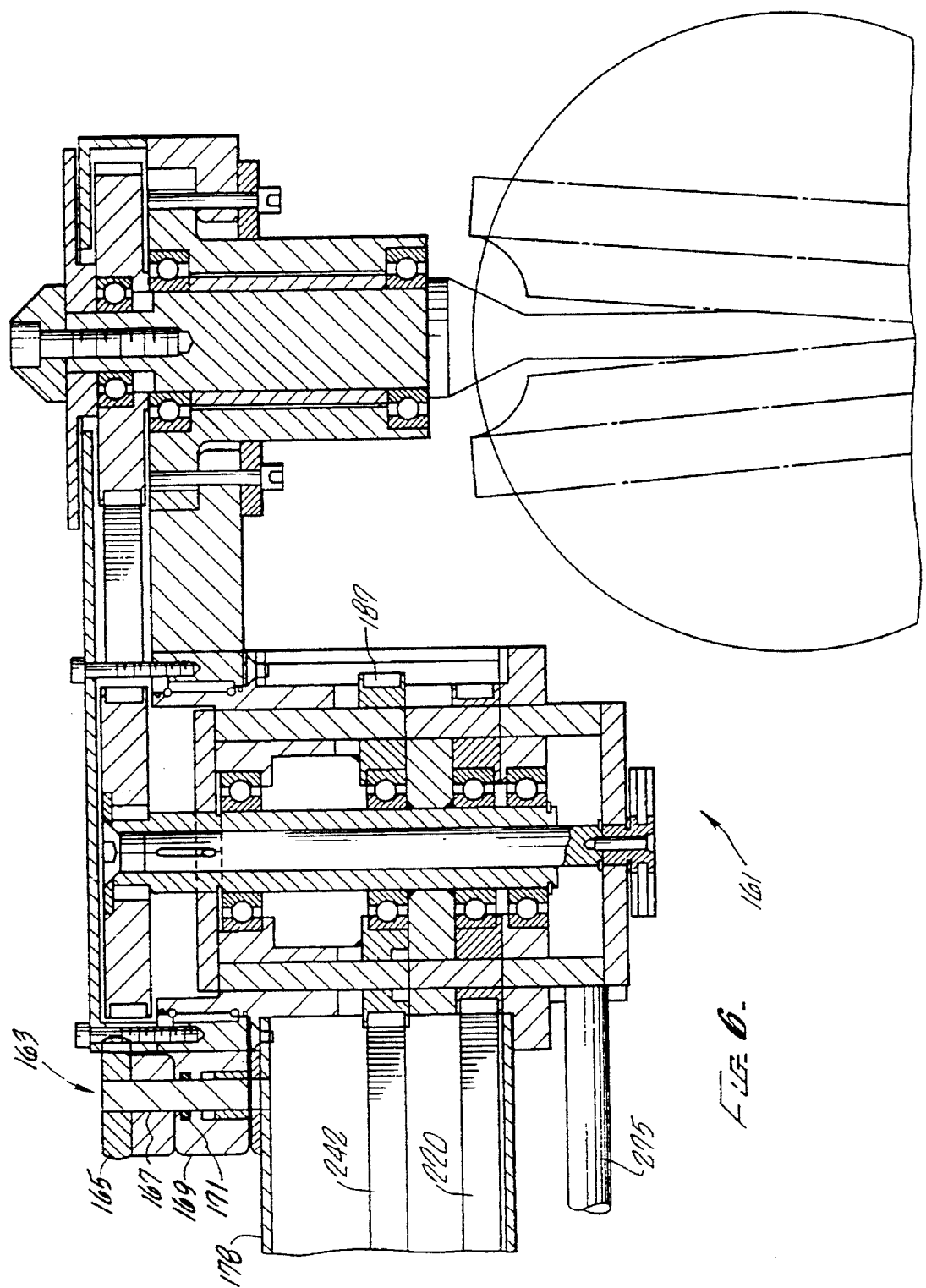
FIG. 6 is a section view fragment of the right rear leg and chassis of the dolly of FIG. 1.

As shown in FIG. 6, a second or right side steering shift assembly 161 is provided at the right rear of the dolly 102. However, this shift assembly 161, although similar to shift assembly 160, does not include a shaft drive sprocket 188.

The front legs 108 and 110 do not include or require any steering shift mechanism or a conventional steering drive sprocket, since the front wheels of the dolly are either in a fixed "straight ahead" position or are engaged in the crab steering mode. The front wheels of the dolly do not require or perform conventional steering correction as do the rear wheels.

Figure 4:
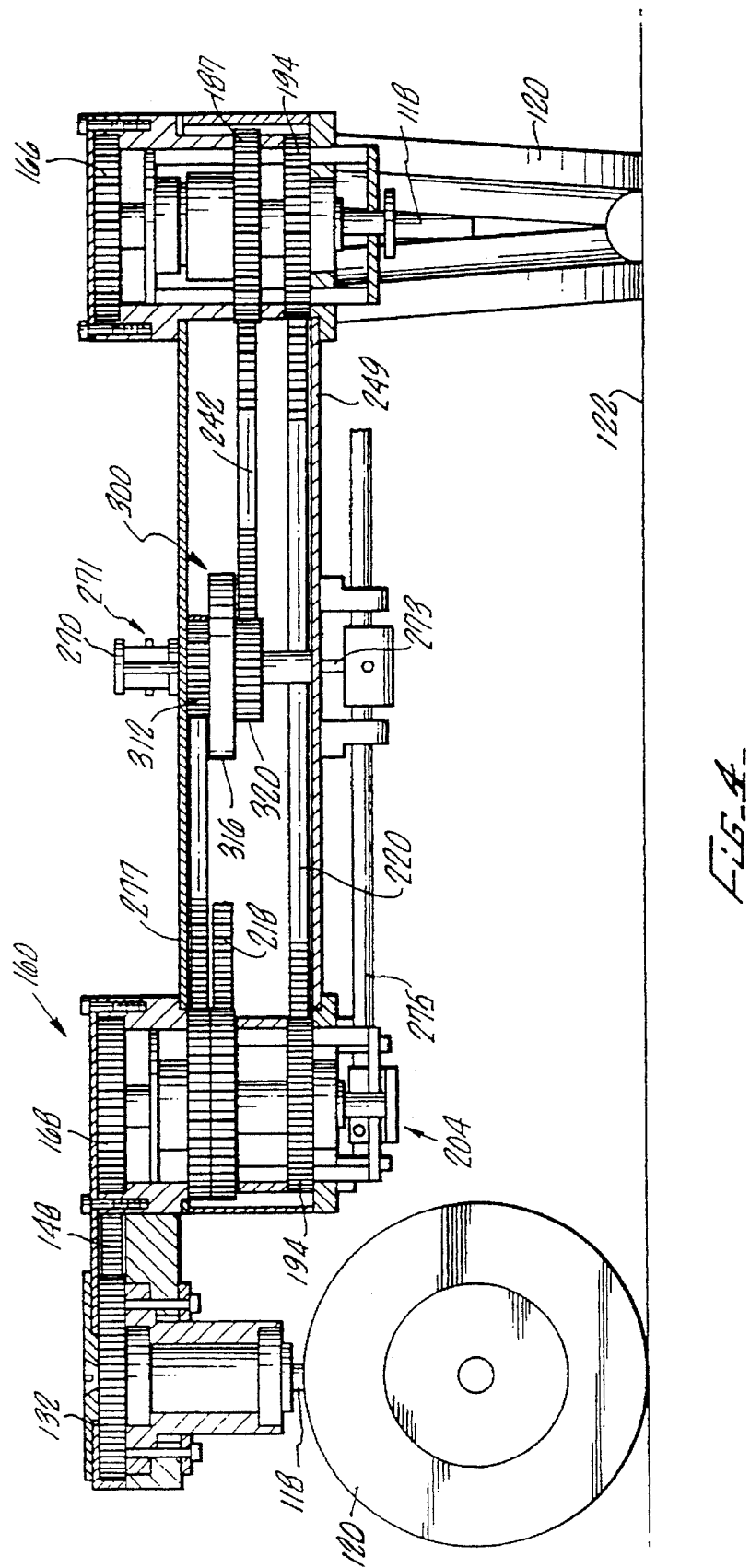
FIG. 4 is a partial section view of the back end of the dolly of FIG. 2 further illustrating the shift apparatus and steering drive system.

Referring to FIGS. 3 and 4, the dolly 102 can be shifted from conventional steering to crab steering and vice versa by actuation of a shift rocker 272 having knobs 270 and 271. With the shift knob 270 in the "up" position as shown in FIG. 4, the lower plate 200 in both the left and right shift assemblies 160 and 161 are in the lower or crab position such that the conventional steering sprockets 186 and 187 are deactivated and the crab sprockets 194 and 195 are driven by the steering system 201. With the shift knob 271 in the "up" position, the plates 200 in the shift assemblies 160 and 161 are displaced upwardly such that the crab sprockets 194 and 195 are deactivated and the conventional steering sprockets 186 and 187 come into play.

As shown in FIG. 4, the conventional shift knob 270 and the crab shift knob 271 are on the rocker 272 linked to an extension shaft 273 extending through the dolly chassis to an arm linkage joined to a pivot shaft 275. The ends of the pivot shaft 275 are attached to a fork assembly 204 at the left end right shift assemblies 160 and 161. The fork assemblies 204 are pivotally joined to the (vertical) shafts 170 in the shift assemblies 160 and 161. Consequently angular rotation of the shaft 275 causes the vertical shafts 170 to shift between conventional and crab steering modes. As shown in FIG. 2, the shaft 275 is positioned between the crab and conventional steering knobs 271 and 270. As one knob is depressed, the other is raised on the lever 272 fixed to the top deck, as the dolly is shifted between conventional and crab modes. The lever is preferably operated by foot.

Thus, the steering shift assembly 160 and 161 allows the dolly 102 to be shifted from conventional steering, i.e., wherein the front wheels of the dolly would remain fixed in a "straight ahead" position with the rear wheels performing the steering, to a crab steering mode wherein all wheels remain parallel to each other and in the same direction, such that the dolly can "crab".

Figure 7:
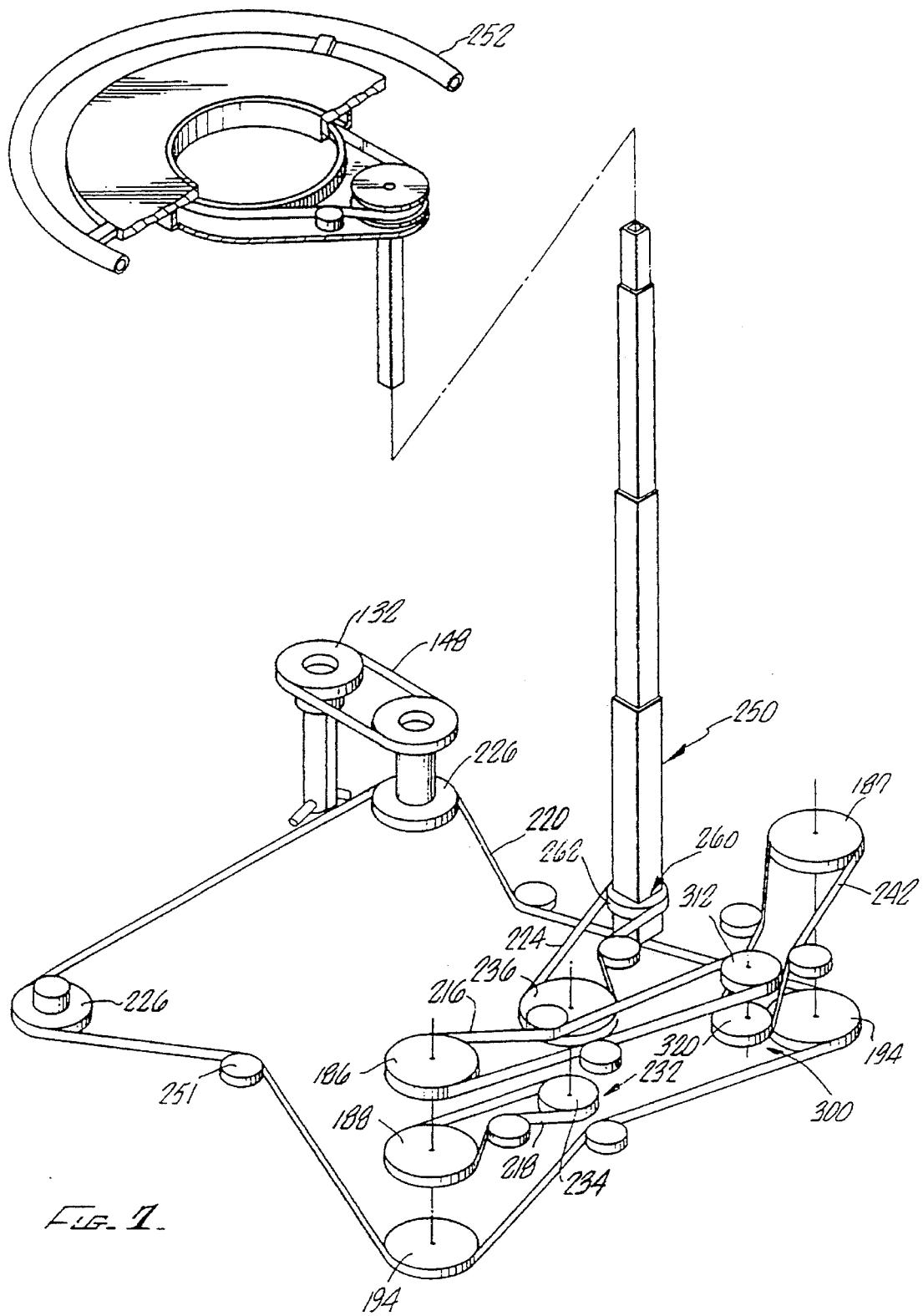
FIG. 7 is a schematic illustration of the steering system of the camera dolly of FIG. 1 linked to a steering assembly of a camera pedestal.

FIGS. 2 and 7 illustrate the steering system 201 of the dolly unit 102. As shown therein, the crab belt 220 continuously loops around and drivingly engages the crab sprockets 194 and front chassis sprockets 226, all of which are contained within the dolly chassis 104. The front chassis sprockets 226 are fixed to a shaft which drives the drive sprockets 106 in the front legs 108 and 110. Idler pulleys 251 are provided along the sides of the chassis for tensioning the crab belt 220. All of the belts in the steering system 201 are toothed rubber belts and have a flat back surface, such as Gates Rubber Co. POLYCHAIN GT belts.

A primary sprocket 262 has a through square receptacle 260 adopted to receive a telescoping steering drive shaft 250 linked to the steering assembly of the pedestal, as described in my U.S. Pat. No. 5,197,700, incorporated herein by reference. Application Ser. No. 591,525 filed Oct. 1, 1990. A first ratio belt 224 drivably connects the primary sprocket 262 to an outer or second sprocket 236 on a two stage idler 232. A first or inner sprocket 234 of the two stage idler 232 is linked by the drive belt 218 to the shaft drive sprocket 188, as shown in FIG. 3. The conventional steering sprocket 186 is connected by the left conventional steering belt 216 to a steering corrector unit 300, and specifically to a first sprocket 312 on the corrector 300. A second sprocket 320 on the corrector 300 is linked by a right side conventional steering belt 242 to a right conventional steering sprocket 187 within a right side shift, assembly 161, as shown in FIG. 6. Idler pulleys are provided as shown in FIG. 2 to provide proper belt tensioning and for alignment purposes during manufacture or maintenance.

The sprockets in the steering system are selected so that the wheels 120 of the dolly will move directly and with the same turning angle as the steering wheel 252 on the pedestal. These ratios can be achieved by using 8M22 sprockets for sprockets 262, 234, 312, and 320; 8M40 sprockets for sprockets 132, 166, 226 and 194; 8M44 sprockets for sprockets 186, 188 and 236 are also available from Gates Rubber Co. (the last 2 digits indicating the number of sprocket teeth). The initial drive reduction is 112÷28=4. The corresponding drive increase is (44÷22)(2)=4. The ratio between the steering wheel and the wheels, therefor, is 1 to 1. These sprockets can be machined down in height to maintain a compact and streamlined dolly chassis. Use of these sprockets with the Gates POLYCHAIN GT belts provides for exceptionally precise movement and handling of the steering system 201 which is very noticeable and desirable to the dolly grip or user. This steering system is also very quiet in operation permitting it to be freely used on sound stages without interfering with the audio aspects of television or motion picture production. Although the present embodiment uses toothed belts, chains, if made suitably quiet, could also be used.

Figure 11:
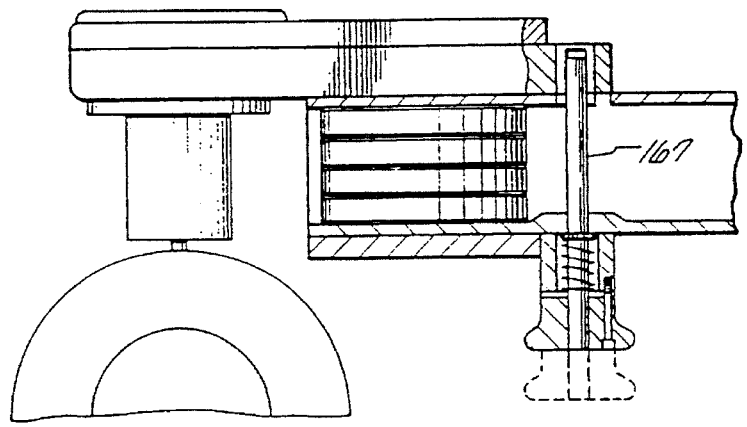
FIG. 11 is a side elevation view fragment in part section of the second embodiment of the leg locking system.

A leg locking pin system 163 is provided for each leg to lock the leg into its selected position. As shown in FIG. 6, a crescent shaped handle 165 is joined to a pin 167 in a pin frame 169. A bushing or O-ring 171 in the frame 169 surrounds the pin 167 and provides damping to its movement. The pin 167 is releasably engageable through a bore in a flange of the hardened innerbearing frame 178 overlying the dolly chassis. An alternative embodiment operated from underneath the dolly chassis is shown in FIG. 11.

As shown in FIGS. 3, 4, 7 and 8, the dolly chassis may be made as generally square or rectangular weldment with removable top and bottom plates 277 and 279 spaced apart by the frame 280, tubes 282, and ribs 284 (FIG. 8). Accessory pockets 285 are provided at the front and sides of the chassis to hold seats, platforms, pushbars, etc.

As is well known in the art, to achieve proper steering geometry with conventional steering, the rear wheels must be oriented so that their axes (i.e., a line perpendicular to the wheels and co-linear with the axles) intersect at a point on a line passing through the centerlines of the front wheels. To the extent the rear wheels deviate from this geometry, rolling friction will be increased due to scrubbing of the wheels on the floor surface. This principle is illustrated schematically in FIG. 12B and Table 1 which shows steering angle correction for the dolly 102 when the legs 108, 110, 112, and 114 are in front and rear leg positions E-B and F-A as shown in FIG. 2. As shown in FIG. 12B and Table 1, the steering correction required in conventional steering of the rear wheels ranges from 0.0 when the dolly 102 is steered to move in a straight line, to a maximum 107.10° for the right rear wheel when the dolly is steered to pivot around point P in FIG. 12B. The left and right rear wheels in FIG. 12B are designated by AA and BB. As shown, wheels BB turn 72.9° to meet point P.

FIG. 12B and Table 1 show the steering correction required in conventional steering, for, as one example, a dolly having wheels (or kingpins) spaced apart side to side by a width K=20.158 inches and spaced apart front to back by a length L=32.758 inches. The dimension r is the distance or radius in inches from the center of the dolly's radial path of travel to the base line M extending centrally through the right side wheels. The angles a and b are the angles in degrees of the wheel axles (i.e., or a line extending perpendicular to the plane of the wheels) to the base line N.

A steering corrector or transmission unit 300 sets the proper relative angles of the rear wheels to achieve proper steering geometry. As shown in FIG. 9, the corrector unit 300 includes an eccentric hardened shaft 302 having an upper or first shaft section 304, a central section 324 and a lower or second shaft section 326 offset from the first shaft section 304. A threaded bore 306 extends into the first shaft section 304. Correspondingly, a threaded bore 330 extends into the second shaft section 326. A top sprocket 312 is rotatably mounted onto the first shaft section 304 through a needle bearing 308. A belt flange 310 is integral with the top sprocket 312 and the top sprocket is held onto the first shaft section 304 by a snap ring 305. A top plate section 314 is rigidly attached to or integral with the top sprocket 312. Similarly, a bottom sprocket 320, of the same size and pitch as the top sprocket 312 is rotatably mounted on the second shaft section 326 by a bearing 322. A belt flange 328 is integral with the bottom sprocket 320 which is held onto the second shaft section 326 by a snap ring 327. A lower plate 318 is rigidly attached to or integral with the bottom sprocket 320. A correction disk 316 is rotatably mounted on the central section 324 of the eccentric shaft 302 on a Glacier DU bushing or suitable alternate and between the upper plate 314 and lower plate 318.

The top plate 314 section includes a radial slot 332 containing an upper dog plate 336. Similarly, the lower 318 has a radial slot 334 containing a lower dog plate 338. A pin 340 connects the upper dog plate 336 to the lower dog plate 338 through a bore in the disk 316. An alignment hole 342 passes through the plates 314 and 318, and disk 316. During factory assembly, a pin placed in the hole 342 maintaining alignment within the corrector 300 while it is being installed. When in the shifting position the pin 340 must be at 90° to a plane passing through the centerline of shafts 304 and 326. (90° to the position shown in FIG. 9 or perpendicular to the plane of the paper.)

When installed in the steering and drive system 201, the eccentric shaft 302 is fixed to the dolly chassis 104 by screw fasteners passing through the dolly chassis 104 into the threaded bores 306 and 330. As the dolly is steered in the conventional steering mode, belt 216 turns the top sprocket 312 on the shaft 302 as shown in FIGS. 2 and 9. The first sprocket 312 is linked to the second sprocket 320 through the interaction of the disk 316 and the interlinked sliding dogs 336 and 338. The geometry of the corrector 300 causes the second sprocket 320 to turn through a "corrected angle" with respect to the first sprocket 312. Correspondingly, the second sprocket 320 drives the right side conventional steering belt 242, thereby driving the sprockets in the right rear leg 112 and causing the right rear wheels to be steered to the proper conventional steering angle. The corrector 300 operates continuously, i.e., it sets very accurate corrected steering regardless of wheel position. If the steering wheel 252 is turned 180°, 360° or through any angle, the corrector 300 uniformly maintains the appropriate conventional steering angles. In addition, testing shows the correction provided by the corrector 300 to be so accurate (in the straight ahead leg configuration and 3-point configuration) that any "misalignment" of the rear wheels in conventional steering is so slight as to be beyond human perception.

In FIG. 10, 402 represents the axis of the first section 304, 404 represents the axis of the central section 324, and 406 represents the axis of the third section 326 of the shaft 302.

408 is shown 90° to the alignment position. With the sprockets and disk oriented to the position 410 in FIG. 10, there is 0 correction, i.e., the wheels are straight ahead (the shifting position). Positions P1–P8 in FIG. 10 correspond to the angular movements shown in FIG. 12A and 12B.

Figure 12A:
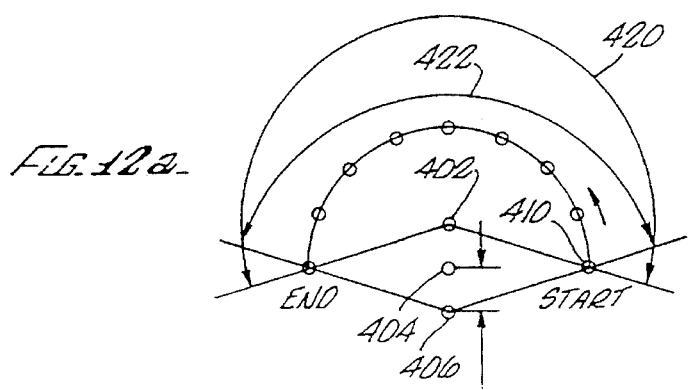
FIGS. 12A and 12B are geometric constructions of the steering correction provided by the corrector shown in FIG. 10.
Figure 12B:
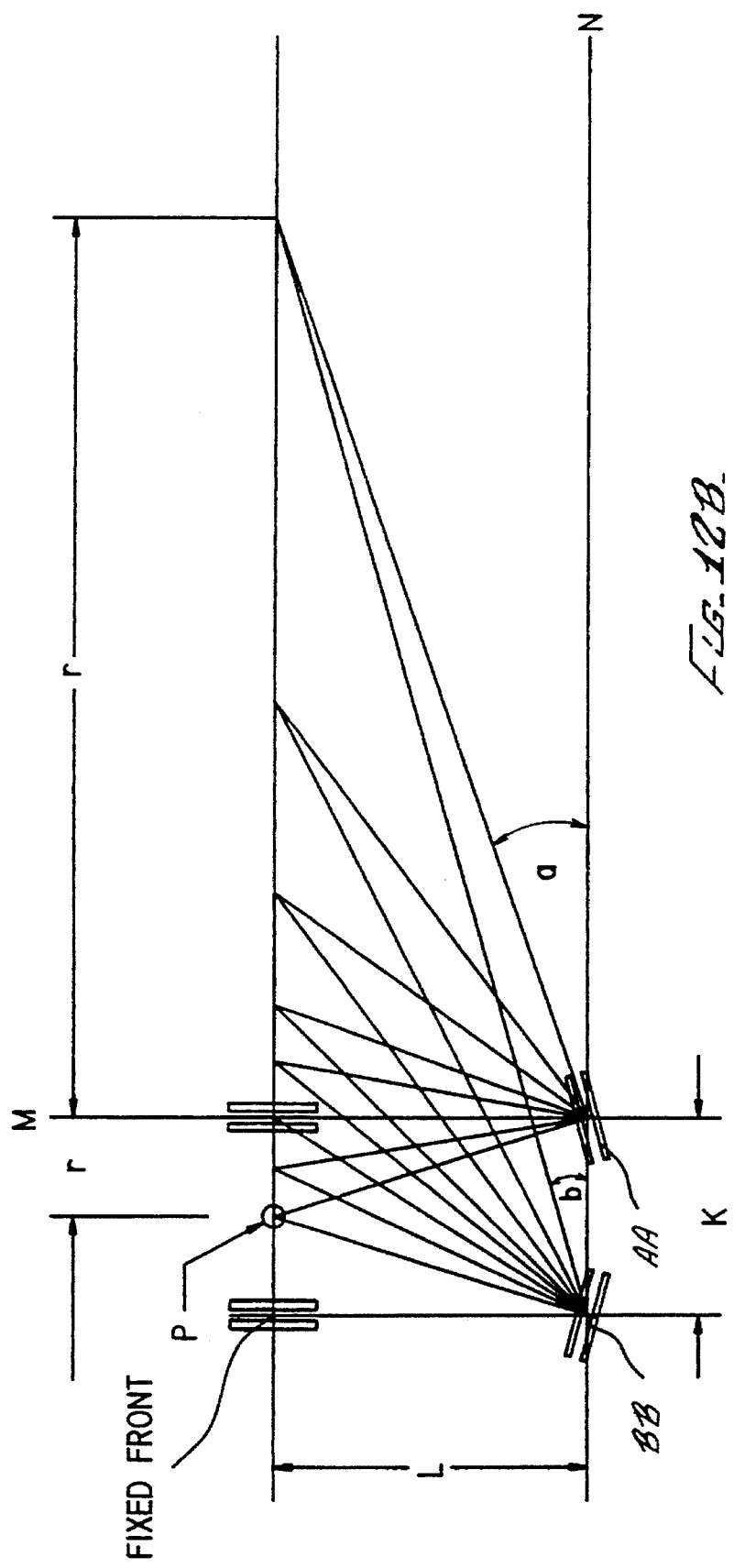

Referring to FIG. 12A, the correspondence of the centers of rotation 406, 404 and 402 are graphically represented. The arc 420 sweeps through 214.238°, i.e., this is the angle of rotation of the top sprocket 312 about its center of rotation 402, at maximum correction. This corresponds to a king pin angle of rotation of the wheels of 107.10°, due to the 2:1 ratio of the sprocket sizes between the corrected sprockets and the conventional steering sprockets 186 and 187. The lower sprocket 320 which rotates about axis 406, for the same movement, sweeps through arc 422 comprising, an angle of 145.093°, again from start or 0 correction to maximum correction. This movement of the lower sprocket 320 turns the right rear wheels to an angle of 72.90°, again one half of the amount of rotation of the sprocket 320 due to the sprocket drive ratios. These numbers correspond to a corrector offset of 0.231 in. Other offset values can be selected for various wheel base combinations. FIG. 12B, in addition, shows the relationships of the intermediate wheel positions designated in FIGS. 10 and 12A. Of course, the corrector 300 operates continuously to correct steering regardless of the increments shown or steering angle. The angles selected in FIGS. 8 and 12A and 12B are examples selected for illustration purposes.

Figure 13:
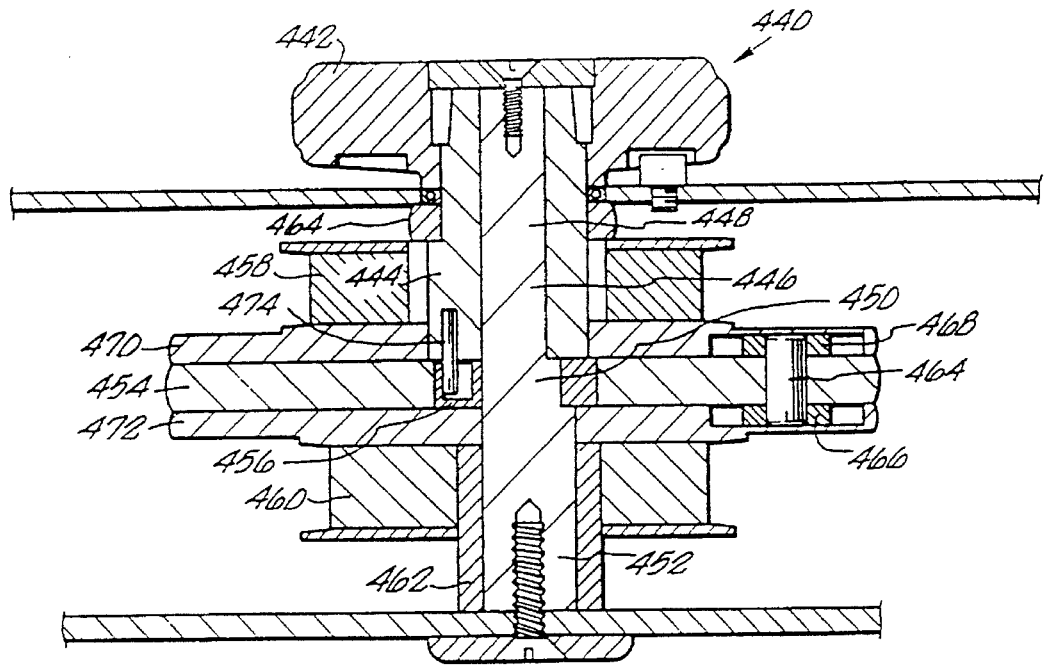
FIG. 13 is a section view of a second embodiment of the present steering corrector.

The corrector 300 shown in FIG. 9 does not provide exact correction for conventional steering when the legs are in the track position. Shown in FIG. 13 is an alternative embodiment of the corrector 300 which is adjustable to provide proper steering correction for all leg configurations. Referring to FIG. 13, an adjustable steering corrector 440 has a knob 442 on top of the dolly chassis. A shaft 446 has a first section 448, a central section 450 and a second section 452 offset from the central and first shaft sections. An eccentric drive collar 444 is rotatably mounted on the first shaft section 448. A central plate 454 is fixed to a floating hub 456 which is rotatably mounted onto the central shaft section 450. A top sprocket 458 is rotatably positioned over the eccentric drive collar 444. A bottom sprocket 460 is rotatably mounted on the lower shaft section 452. Upper and lower spacers 464 and 462 secure the corrector 440 within the dolly chassis. A pin 464 interconnects sliding dogs 466 and 468 which are radially slidable in slots in the plate sections 470 and 472 of the upper and lower sprockets 458 and 460. A collar pin 474 extends from the eccentric drive collar 444 into the floating hub 456. By turning the knob 442, the amount of offset between the axis of rotation of the sprockets 458 and 460 is changed from an amount suitable for correcting steering in the 3-point simulation and straight ahead positions, to correcting steering for the track position. Accordingly, proper steering correction can be implemented in any of the three dolly leg configurations by turning the knob 442 on the corrector 440 to select the appropriate selection mode of the corrector 440.

Figures 14, 16:
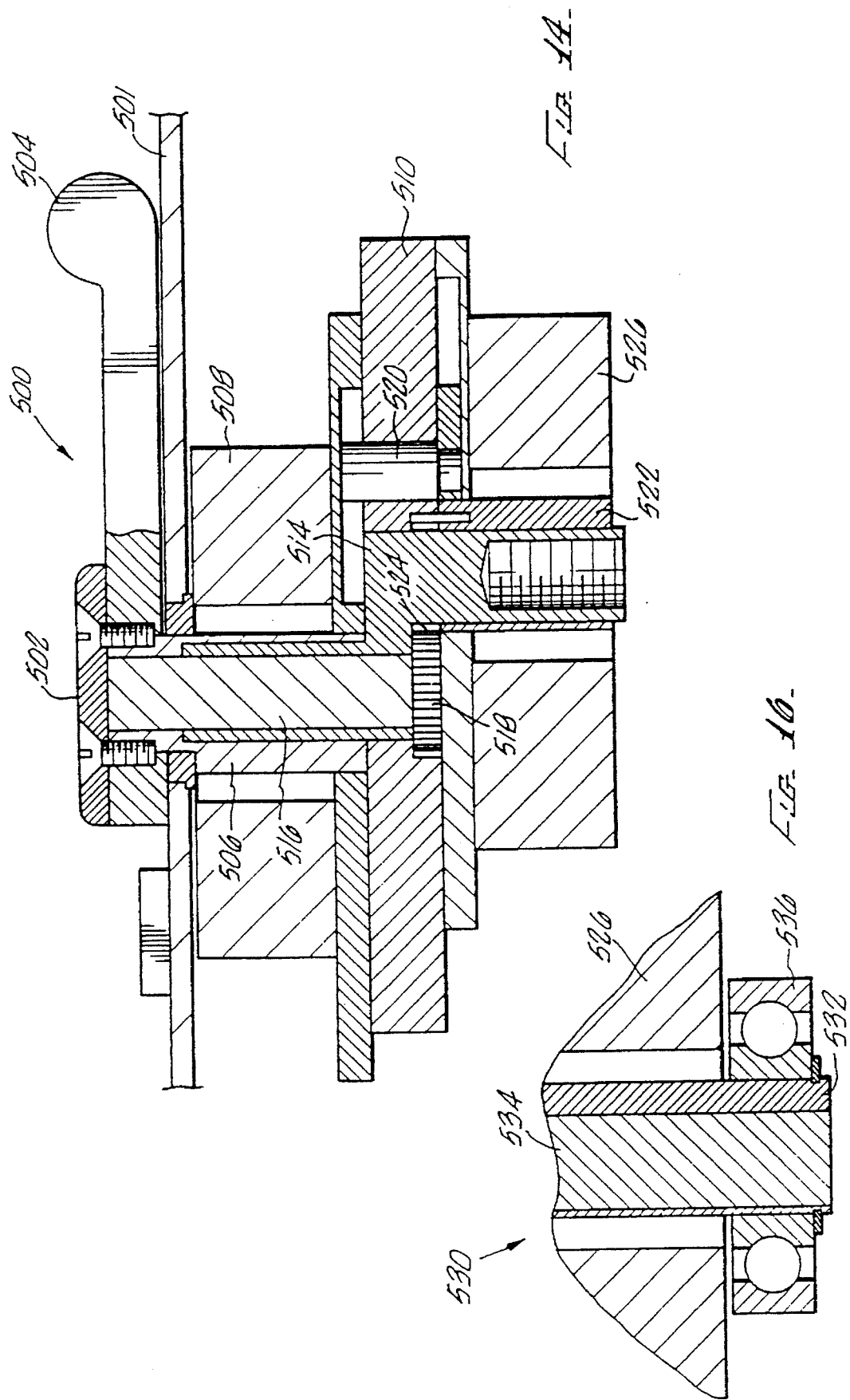
FIG. 14 is a section view of a third embodiment of the present steering corrector.
FIG. 16 is a partial section view of an alternate embodiment of the steering corrector of FIG. 14.
Figure 15:
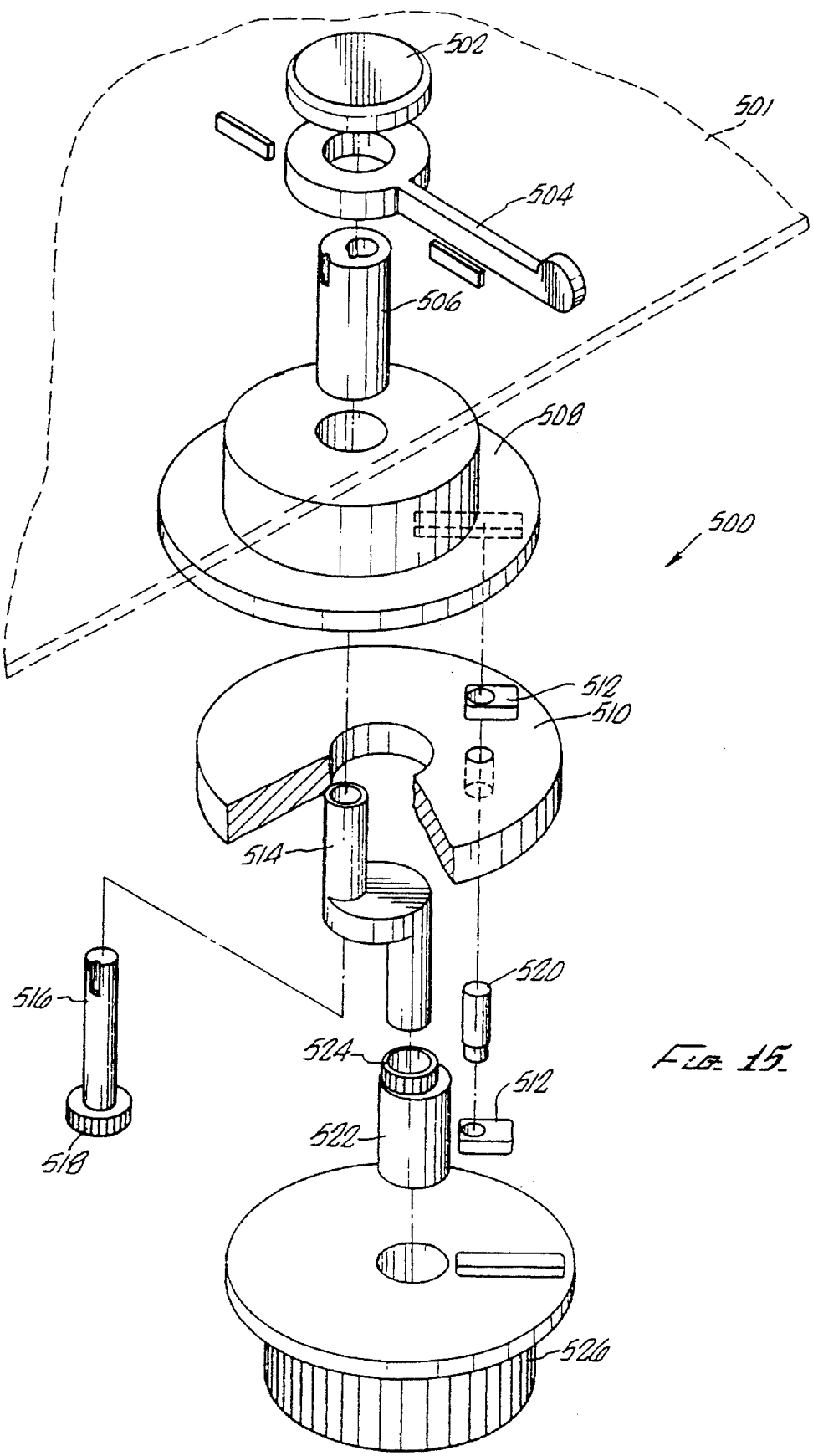
FIG. 15 is an exploded perspective view of the corrector of FIG. 14.

Another adjustable steering corrector 500 is shown in FIGS. 14 and 15. The top cap 502 and hand lever 504 of the steering corrector 500 are above the top deck 501 of the dolly chassis. The hand lever 504 is pinned to a top cam 506 which passes through a top sprocket 508 on a hub 514. A gear post 516 having a spur gear 518 at its lower end passes through the hollow hub 514 and is attached to and turns with the lever 504 and top cam 506. A bottom cam 522 has a spur gear 524 attached at its upper end. The bottom cam 522 is positioned within a lower sprocket 526 on the hub 514. The steering corrector 500 has a disc 510 and sliding dogs 512 connected by a pin 520, similar to the correctors shown in FIGS. 9 and 13. The principle of operation of the corrector 500 is also similar to the operation of the correctors shown in FIGS. 9 and 13. However, in contrast to the adjustable corrector 440 shown in FIG. 13, the corrector 500 shown in FIGS. 14 and 15, by virtue of the cam and spur gear arrangement, achieves twice the offset since movement of the hand 23 lever 504 causes both the top sprocket 508 and the lower sprocket 526 to move apart. This provides for a wider range of steering correction geometry within a compact size. In the preferred embodiment, this version corrects the offsets from 0.204 in. to 0.310 in. (axle centerline separation is 0.408 in. to 0.620 in.).

FIG. 16 shows a steering corrector 530 identical to the steering corrector 500 in FIG. 14, except for the design and mounting of the lower end. As shown in FIG. 16, steering corrector 530 has an extended bottom cam 532 and extended hub 534, with the extended bottom cam 532 secured within a bearing 536. The bearing 536 is rigidly mounted within the dolly chassis. As the lever 504 on the steering corrector 530 is shifted, there is no shifting of the lower sprocket 526. All movement due to the cam action occurs at the upper end of the transmission 530. The chassis top deck surrounding the transmission 530 is slotted (0.212 in. in the preferred design). A bushing having a square outside shape is provided around the transmission 530 to guide the upper end of the transmission in the slotted chassis deck.

As shown in FIGS. 1–4 and 28, the camera dolly 102 has steerable front wheels 120A and back wheels 120B. In FIG. 2, all four sets of wheels (and the legs as well as drawn in solid lines) are in the "straight ahead" position corresponding to wheel angles of 0° or 180°.

In the conventional steering mode, the front wheels 120A are secured in a straight ahead (0° or 180°) position, while the back wheels 120B are steered with the steering wheel 252. In crab steering mode, both the front wheels and back wheels are steered at the same angle, such that the camera support dolly can be steered and pushed laterally to the side, front or back, or at any desired angle, without changing the orientation of the camera 50.

Referring to FIG. 17, to use the crab and conventional steering shift rocker 272, the dolly operator or grip must physically depress either pedal with a hand or foot. When the steering system 201 of the camera dolly is to be shifted between crab and conventional steering, while the dolly is moving during a filming sequence, it can be difficult for the grip to actuate either steering shift pedal while simultaneously smoothly pushing or keeping up with the moving camera dolly. In addition, the steering system 201 can only be shifted between crab and conventional steering when the front and rear wheels are in the straight ahead (0° or 180°) position. This makes the dolly grip's objective of smoothly shifting the moving dolly between steering modes more difficult.

The front sets of wheels will always be properly aligned for shifting since in crab mode their steering angle always matches that of the rear wheels. Thus, when the rear wheels are straight ahead, the front wheels will also be positioned straight ahead. In conventional steering mode, the front wheels are always aligned straight ahead.

Figure 27:
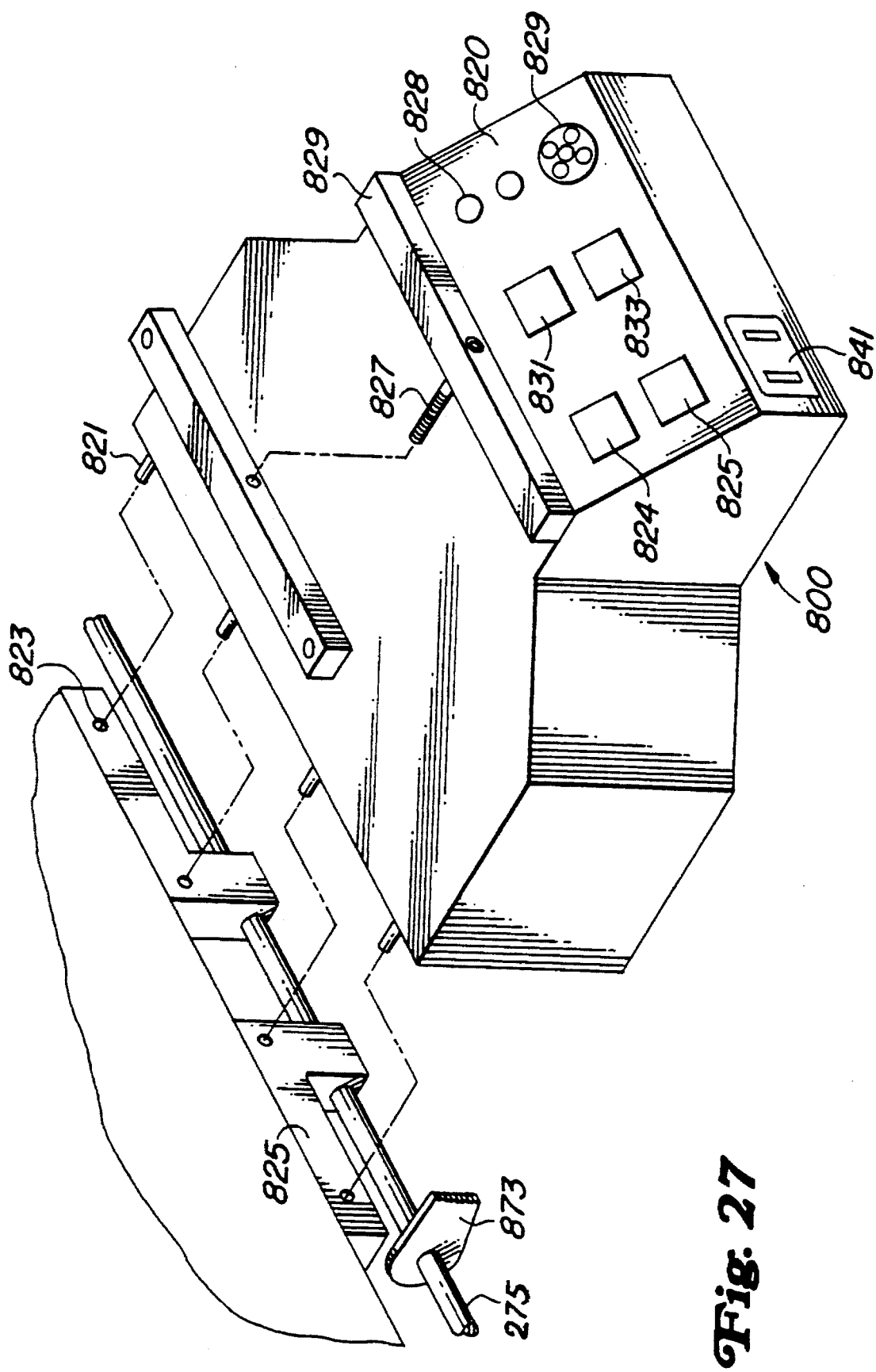
FIG. 27 is a perspective view showing the installation of the electronic shifter onto the camera dolly.
Figure 28:
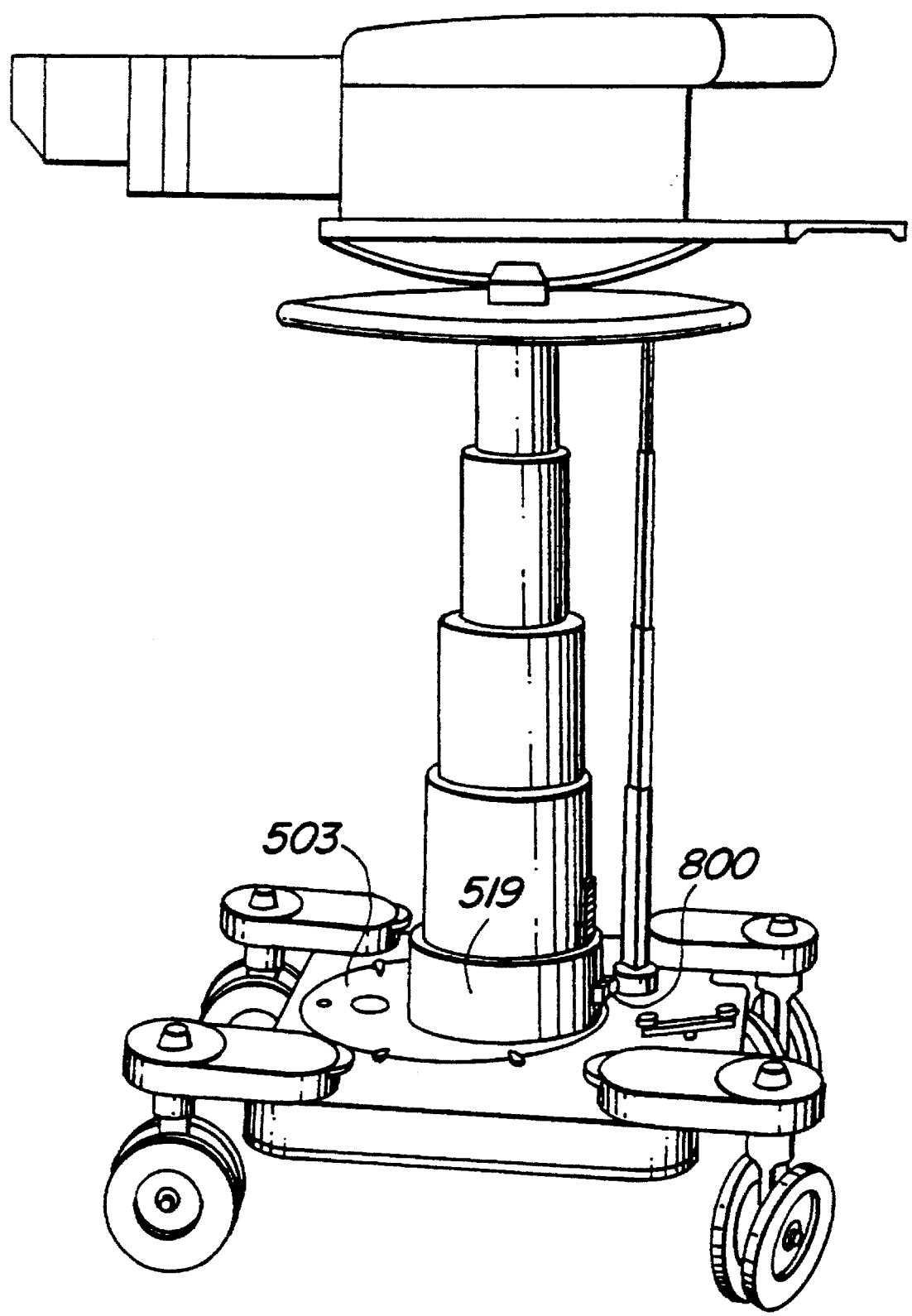
FIG. 28 is a perspective view of the camera dolly with the column fully extended.

As shown in FIGS. 17 and 27, an electronic shifter 800 is provided preferably as an accessory attached to the underside 802 of the camera dolly, to automatically shift the steering system 201 of the camera dolly between conventional and crab steering modes without hand or foot actuation of the shift knobs or pedals.

Figure 19:
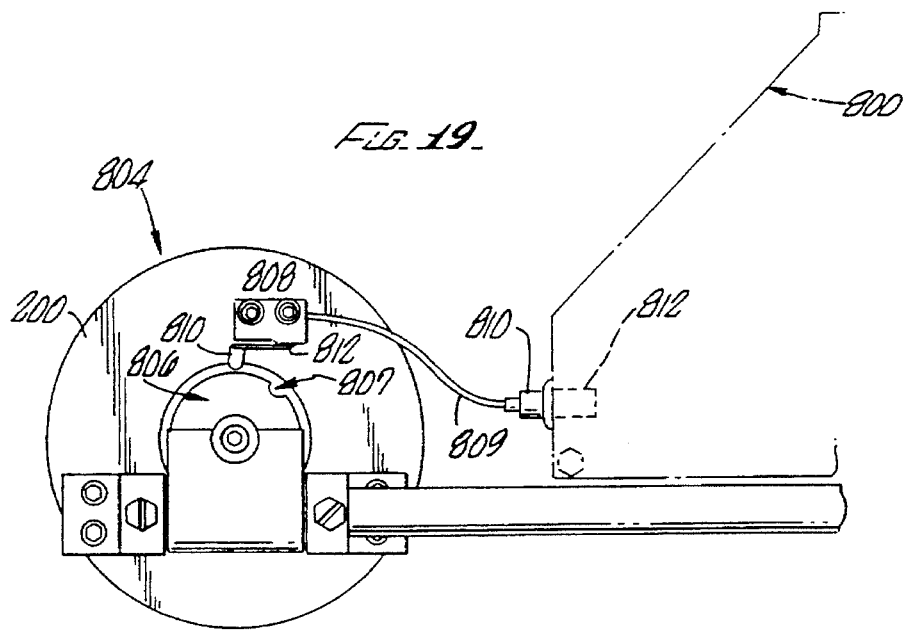
FIG. 19 is an enlarged bottom view fragment of the wheel angle position sensor.

Referring to FIGS. 18 and 19, to detect when the rear camera dolly wheels are in the 0° or 180° position (i.e., in a shiftable position), a shiftable position angle detector system 804 is provided. A notch plate 806 having notches 807 on opposite sides thereof is secured at the bottom of the rear left tubular axle 173. The bearing support or housing 197 as shown in FIG. 3 supports the axle 173 and related components in position. A switch 808 having a roller 810 at the end of an arm 812 is attached to the stationary housing 197. The roller 810 rolls on the outer circumference of the notch plate 806. The notch plate turns as the wheels are steered through the steering system. The switch 808 is linked through a cable 809 and connector 810 to a connector receptacle 812 in the shifter 800.

Only the rear left wheel position need be monitored for a shiftable position (0° or 180°) because when the rear left wheel is at 0° or 180°, due to the design of the steering system 201, the rear right wheel (or pair of wheels) will necessarily also be in a like position.

Figure 20:
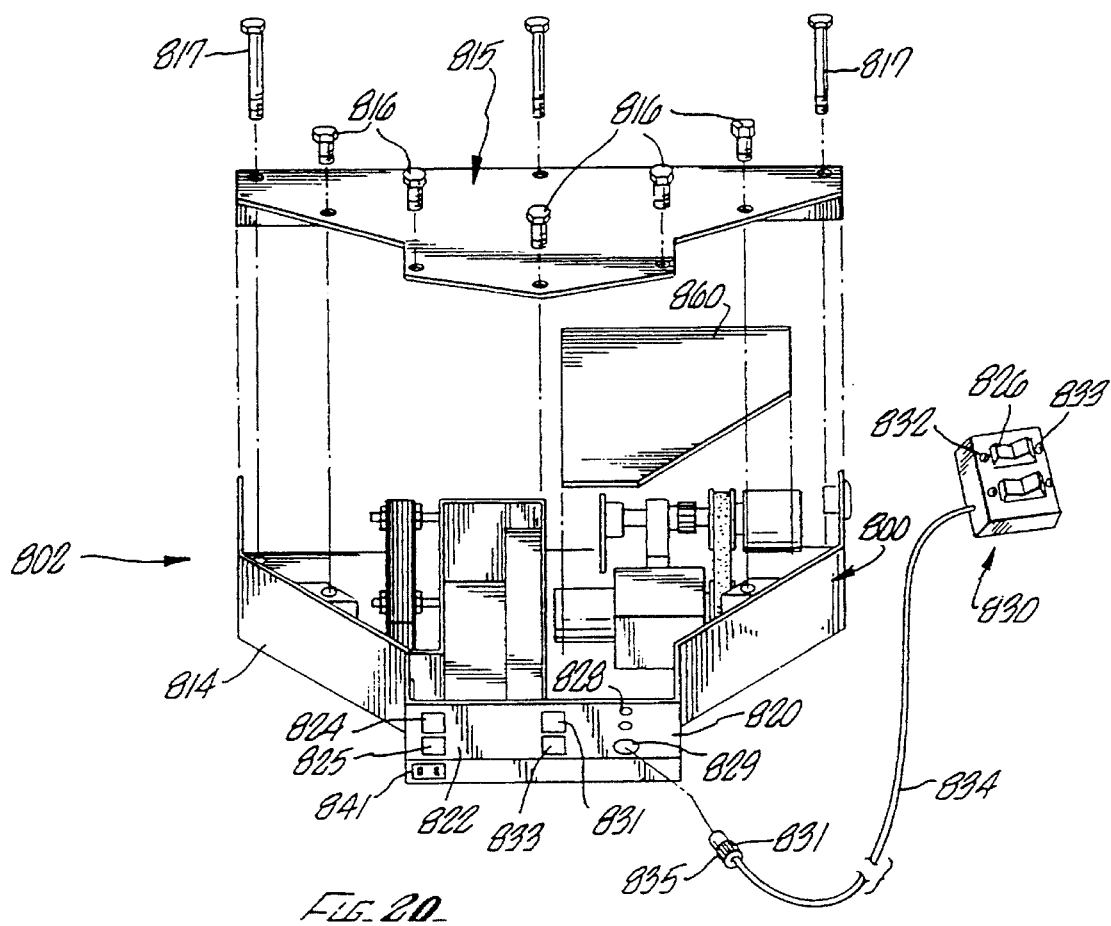
FIG. 20 is a partially exploded perspective view of the electronic shifter housing.

Referring to FIGS. 20 and 21, the electronic shifter 800 has a removable cover 815 held to a housing 814 with screws 816. As shown in FIGS. 17 and 27, the shifter is mounted underneath the camera dolly with the cover 815 facing the floor or ground surface 122. Mounting pins 821 extending from the back of the housing 814 slide into and engage mounting holes 823 in bearing blocks 825 attached to the dolly lower surface 402. A single attachment bolt 827 engages a mounting block 829 adjacent the back edge of the dolly lower surface 802. Thus the shifter can be installed onto the dolly with a single bolt 827 without lifting or tilting the dolly. For more permanent installations, the shifter housing can be bolted onto the frame of the dolly.

Figure 25A:
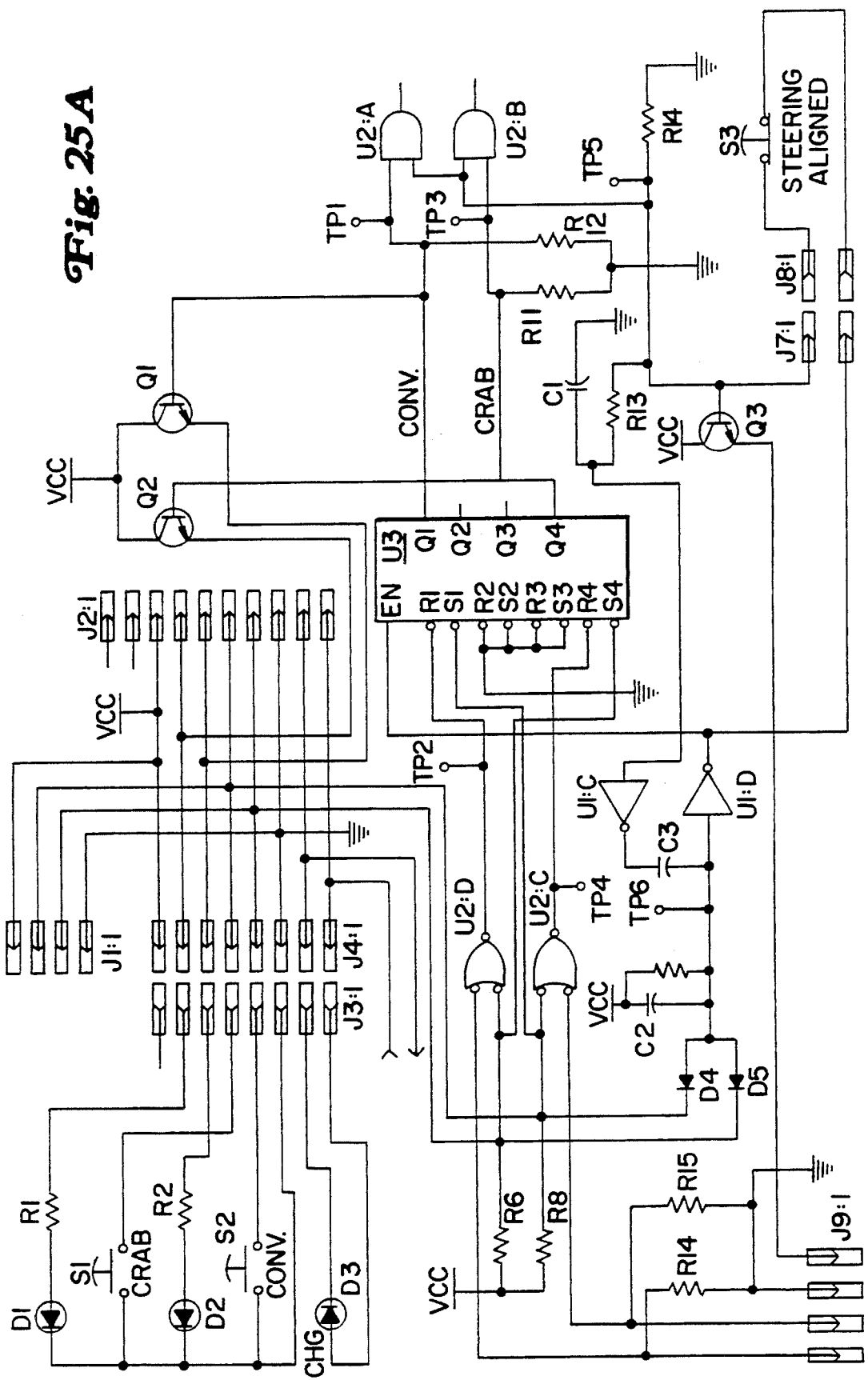
FIGS. 25a and 25b are upper left and right sections of a schematic drawing of the shifter circuitry, including the motor drive and RF or wired remote control interface.
Figure 25B:
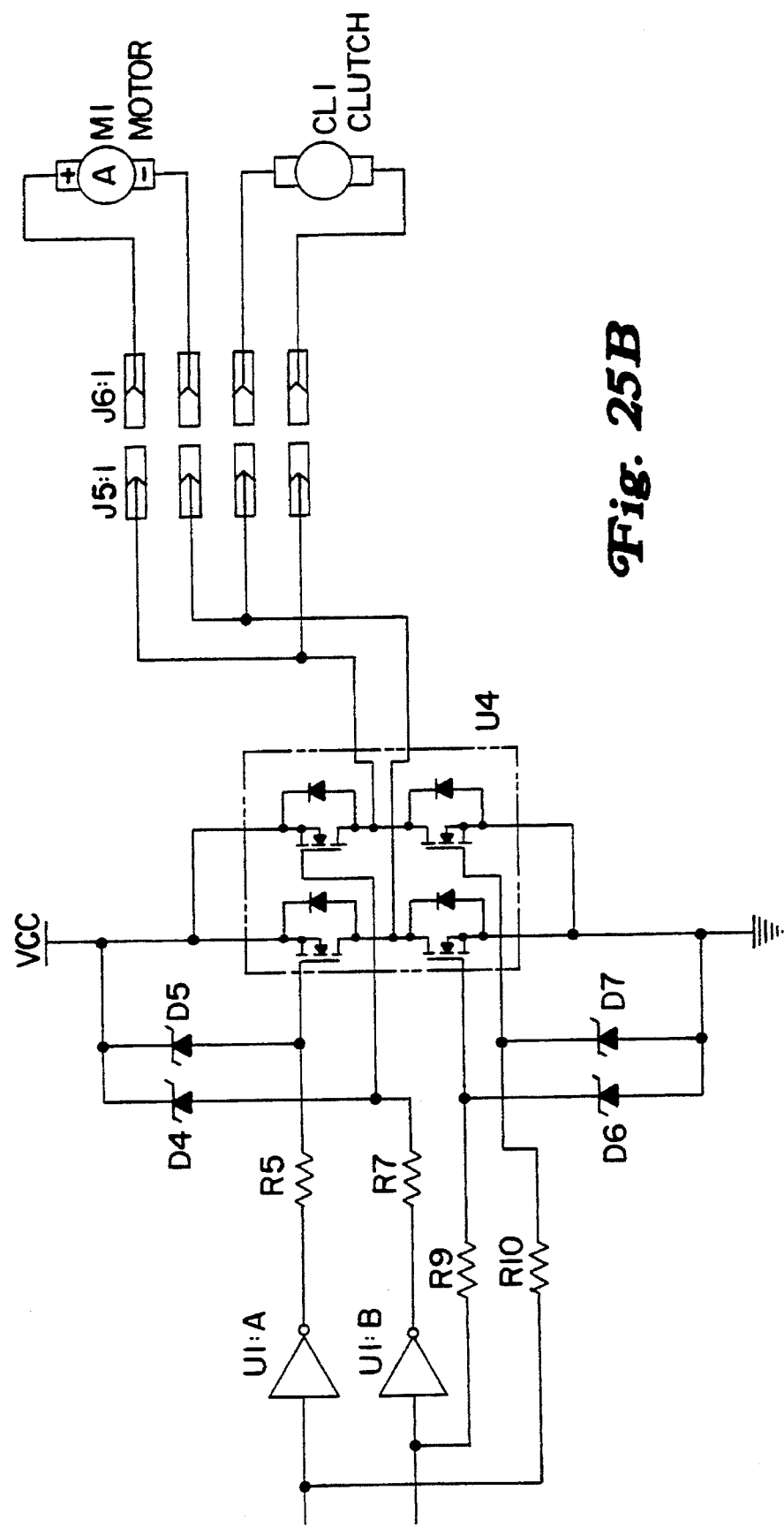
Figure 26A:
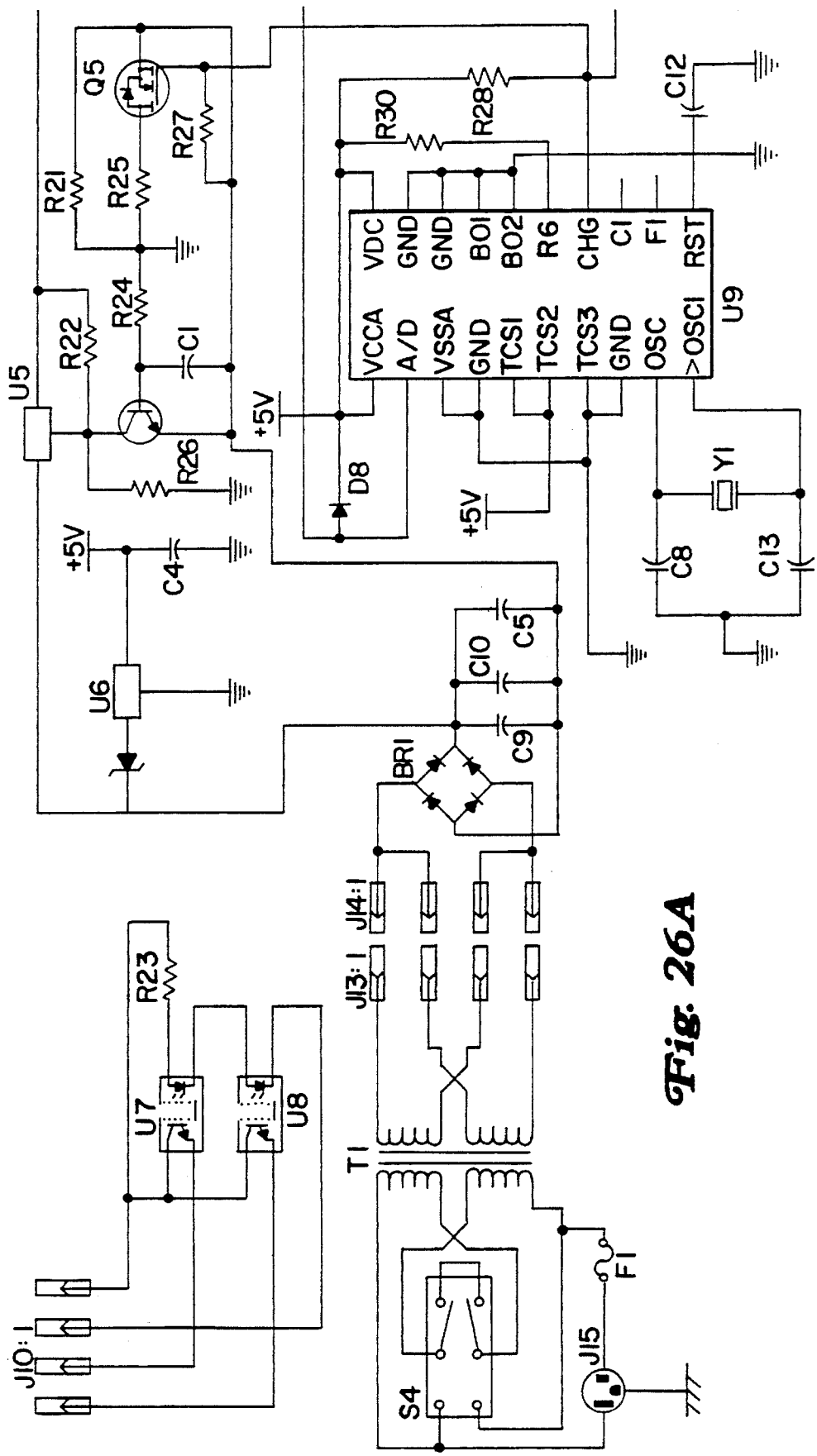
FIGS. 26a and 26b are lower left and right sections of the schematic drawing of the shifter circuitry, including the battery charger.
Figure 26B:
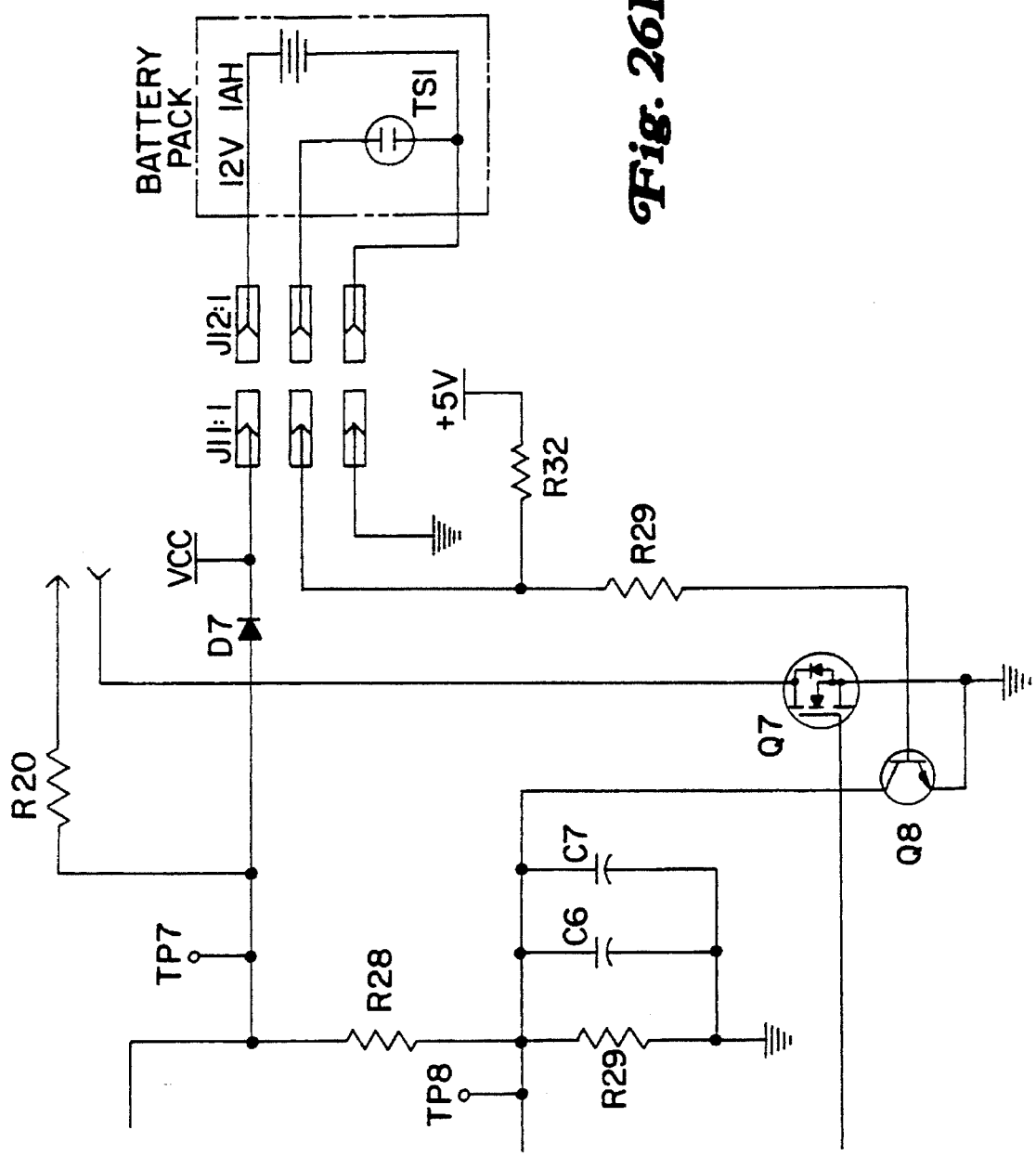

Referring still to FIGS. 20 and 27, the shifter 800 has an angular up-facing front panel 820 having a crab steering mode selection switch 824, and a conventional steering mode selection switch 825. Indicator lights 831 and 833 alongside the crab and conventional steering mode selection switches 824 and 825 indicate the steering mode into which the steering system has been switched. The panel face is inclined upwardly at an angle to allow the dolly operator to easily view the panel while operating the dolly. The panel 820 also has a battery charging indicator light 828 and a connector 829. A remote hand control 830 (FIG. 20) has a steering mode selector switch 826 and indicator lights 832 and 833, similar to indicator lights 826 and 827. A cable 834 connects the remote hand control 830 to the shifter 800 through a connector plug 835 which engages connector 829 on the switch panel. Alternatively, the remote hand control may be wireless with an RF transmitter, as indicated in FIGS. 25a and 25b.

As shown in FIG. 21, the shifter 800 is generally divided into a power supply section 836 and a shift control section 838. The power supply section 836 includes a battery pack 839 preferably using 10 sub c-cells hooked in series and having a capacity of 900 mA hours, or other suitable battery source. A separate A/C line cord can be connected to a socket 841 (FIG. 20) on the flat panel of the shifter 800 for charging. The socket 841 is wired to a transformer 842 which in turn is connected to a power supply circuit board 850 (FIG. 21).

On the other side of the shifter 800, as shown in FIGS. 20 and 21, is a shift control circuit board 860. A D/C motor 862 dives a sprocket 866 on an output shaft 865 through a gear reduction box 864. The D/C motor 862 is preferably a 24-watt, 12 V D/C motor running from 100–200 RPM, with the gear reduction box 864 providing a 43:1 reduction. The gear box and motor are advantageously mechanically isolated from the housing to lessen vibration. A belt 863 links sprocket 866 to a clutch sprocket 867 on an electrically controlled clutch 868. The clutch 868 is in turn linked to a drive shaft 870 having a drive gear 871. A bearing block 872 supports the drive shaft 870 adjacent to the drive gear 871. A gear segment 873 is attached to the shift bar 275 of the steering system of the camera dolly. The gear segment 873 extends through a slot in the housing cover and engages the drive gear 871.

At the end of the drive shaft 870 opposite to the clutch 868 is a detector plate 874 having a hub 875 attached to the drive shaft 870 by a set screw, as shown in FIGS. 22A and 22B. A sector flange 876 extends from the hub 875. Optical interrupter detectors 880 and 882 attached to the shift control circuit board 860 project downwardly on either side of the detector plate 874, to detect whether the extended sector flange 876 of the detector plate is Positioned in between the optical detectors, to thereby determine the steering mode of the steering system and to control the amount of rotation of shaft 870.

FIGS. 25a and b and 26a and b together form a schematic diagram which illustrates the shift control 20 circuit board 860, and the connections to the motor, clutch, RF section, battery and charger. The power supply circuit board 850 provides the voltages as required by the circuitry and battery charging.

FIG. 24 is a flow chart illustrating the logic of the shifter control circuitry. If conventional steering is selected, i.e., by pressing the conventional steering mode selection switch 824, or by use of the remote hand control 830, the timer on the control circuit board 860 is set and the register U2 set to conventional steering. Next, the circuitry determines whether the steering is aligned into a shiftable position, i.e., to a 0° or 180° position. This information is provided by the wheel angle detector 804 which is linked to the control circuit board 860 through cable 809. Specifically, switch 808 is closed and provides a positive enable condition only when the roller 810 protrudes into one of the notches 807 on the notch plate 806. If the timer runs out before the wheels are brought into a shiftable position, the system returns to idle standby. The timer is preferably set approximately 12 seconds. If the dolly wheels are not aligned within that period, generally a steering mode shift would no longer be desired.

If the wheels are aligned into a shiftable position, a shift will take place and additional time is added to the timer to prevent an inadvertent return to idle standby during the shift sequence. The clutch is electrically locked and the motor is run in the conventional steering direction. Referring to FIGS. 21–23, the drive shaft 870 rotates causing the shift bar 275 to also rotate in an opposite sense, thereby shifting the steering system from crab to conventional steering mode. The motor continues to run until the conventional steering optical interrupter 880 detects that the shaft 870 has moved into the conventional steering mode position. The shifter 800 similarly shifts from conventional steering mode to crab steering mode following the sequence illustrated on the left side of FIG. 24.

The shifter 800 permits the dolly grip to shift between steering modes, e.g., using the remote hand control, without leaving his location. In addition, the steering mode can be shifted with the grip at any position around the dolly. Since there is no need for the grip to lift a foot off the ground for shifting or remove a hand from the dolly for shifting, a film sequence can continue smoothly through a shift. The electronic shifter 800 also shifts quickly, smoothly and quietly to avoid jarring the camera dolly or making noise.

In certain applications, it is desirable to be able to push and steer the dolly from behind, without using the steering wheel 252. A steering bracket accessory 600, as shown in FIGS. 29 and 30, is provided for this purpose. The steering bracket 600 has a first arm 602 pivoted to a second arm 604 at a pivot shaft 606. Bushings 624 for receiving accessories are provided on each of the arms 602, 604 of the steering bracket. A steering shaft 609 within the pivot shaft 606 is attached to a first sprocket 608. A second sprocket 611 is provided at the end of the first arm 602 and is drivably linked to the first sprocket by a belt 612. Idlers 610 are provided to tension the bent 612. A handle 614 is joined to a shaft 616. The shaft 616 is long enough to place the handle 614 at a comfortable height for the dolly grip and is preferably adjustable in length. The shaft 616 is releasably attached to the steering shaft 609 through a coupling 618. A capstan 620 is attached to and turns with the second sprocket 608. Thus, the capstan 620 turns identically with the handle 614. The capstan 620 has a square recess at its lower end adapted to fit over the square upper section of the kingpin 128. (See FIGS. 3 and 5.) The belt 612 connects to and drives only the capstan shown on the right side of FIGS. 29 and 30 (which capstan attaches to the rear left dolly kingpin).

To install the steering bracket 600, the fasteners 136 in the two rear kingpins 128 are removed along with the caps 139. The square recesses in the capstans 620 at the ends of the first and second arms, are placed over and engaged onto the square kingpin ends. The caps 139 are then replaced and extended fastening bolts 622 are passed through the caps 139 and capstan 620, and are threaded into the kingpins. The steering bracket 600 is then rigidly attached to the rear dolly legs.

The first and second arms 602, 604 of the steering bracket 600 can open or close together to adapt to the various leg positions shown in FIG. 2. Movement of the handle 614 of the steering bracket 600 is transmitted through the belt 612, sprocket 611, and capstan 620 to the rear left kingpin 128. With reference to FIGS. 2 and 3, the steering movement from the handle 614 works backwards through the steering system, such that the dolly can be steered in crab or conventional steering mode, with the legs in any position.

Figure 31:
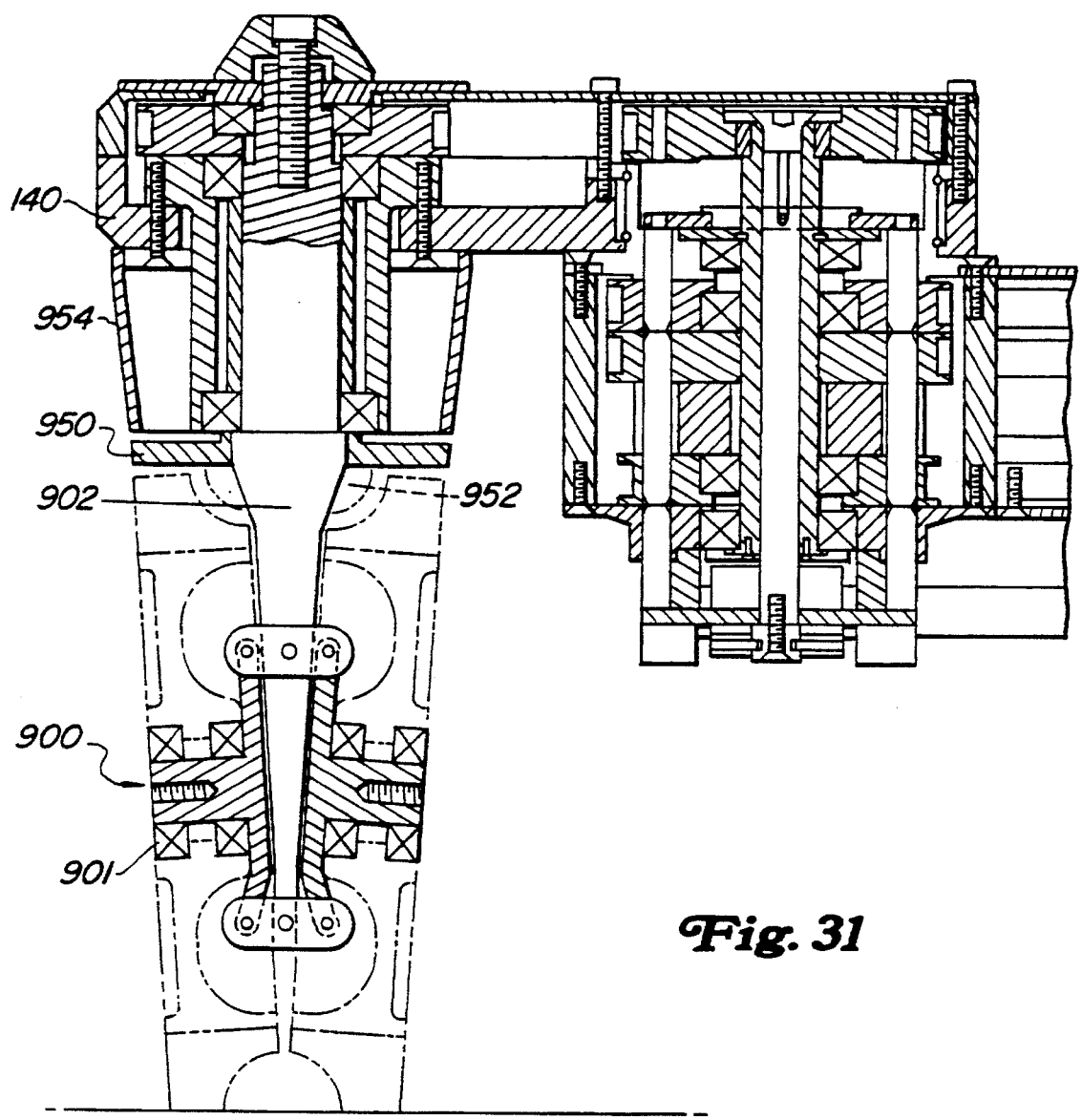
FIG. 31 is a partial section view of a rocker suspension system for the dolly wheels.
Figure 32:
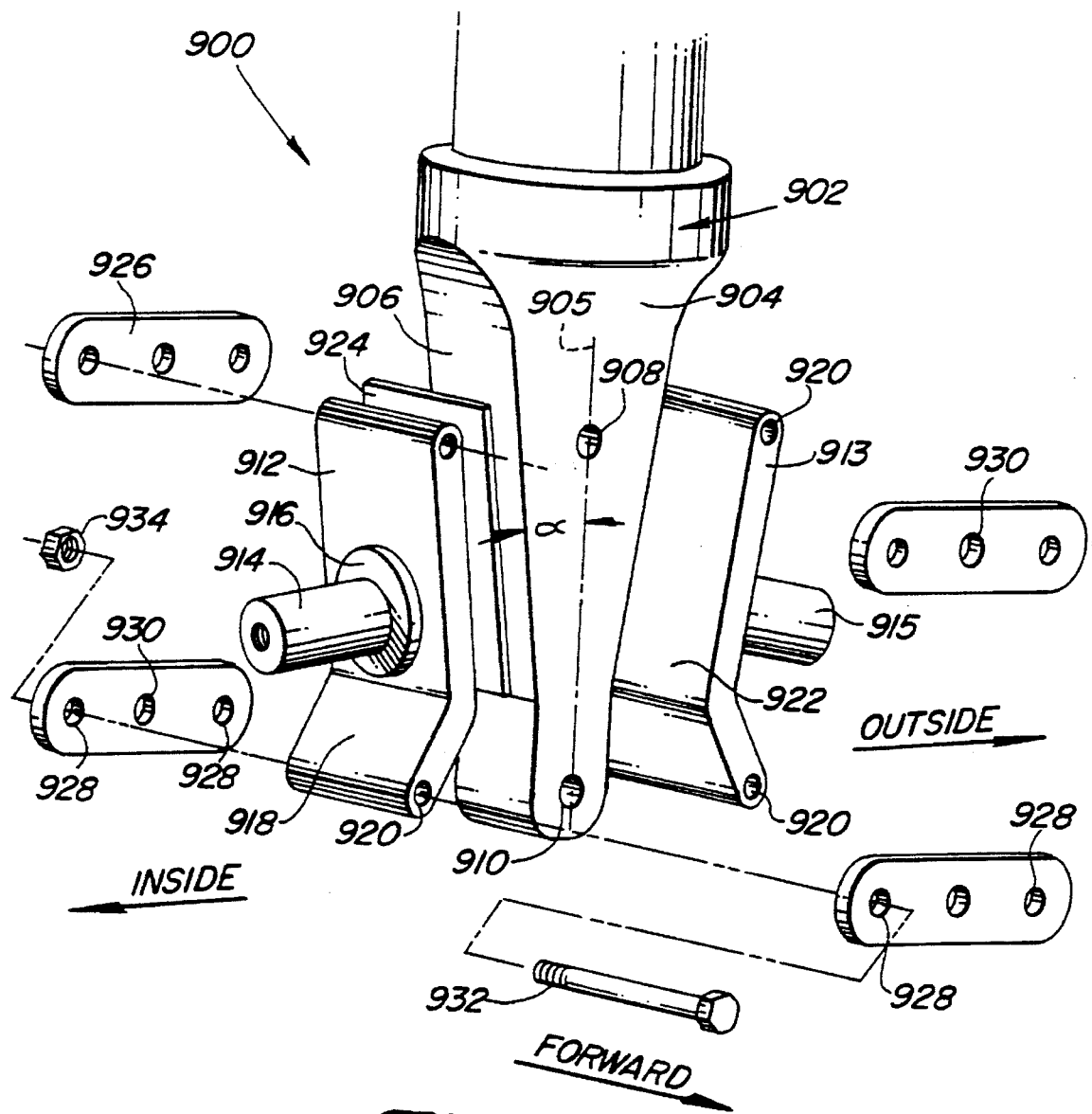
FIG. 32 is an exploded perspective view of the rocker suspension.

Turning to FIGS. 31 and 32, a rocker suspension 900 for the wheels of the dolly includes a kingpin 902 having a lower section 904 with flat sides 906. (In contrast, the kingpin 118 as shown for example in FIG. 5, has integrally attached axles 119.) An axle support plate 912 is provided at both of the flat sides 906 of the kingpin 902. The axle support plate 912 has a wheel axle 914, for supporting the dolly wheels, and an axle shoulder 916. Holes 920 extend through the axle support plate 912 at its upper and lower ends. The lower end 918 of the axle support plate 912 is inclined away from the kingpin 902 so that the holes 920 at the upper and lower ends of the axle support plate can be located in a plane parallel to the centerline of the kingpin 902. The axle support plate 912 has a flat back surface 922. The axle support plates 912 are attached to the kingpin 902 via four rockers 926. Each rocker 926 has two end holes 928 and a center hole 930. Four plate mounting bolts 932 pass through the end holes 928 of the rockers 926 and are secured by lock nuts 934. Two rocker mounting bolts 936, which are preferably identical to bolts 932, pass through the center holes 930 of the rockers 926 and pass through the upper and lower rocker mounting holes 908 and 910, and similarly are secured by locknuts 934.

Figure 33:
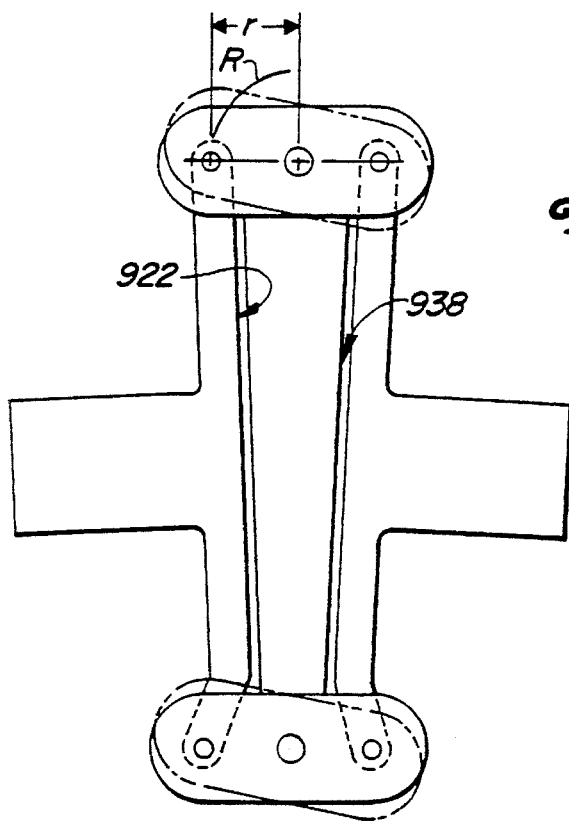
FIG. 33 is a schematic drawing showing operation of the rocker suspension.

Referring to FIG. 33, a small gap 938 ordinarily remains between the flat back surface 922 of the axle support plate 912 and the flat sides 906 of the kingpin 902. The rocker suspension components are preferably machined to close tolerances to minimize play.

A non-metal lining material 924 may be provided in between the kingpin 902 and the flat back surface 922 (parallel to the kingpin flat sides 906) of the axle support plate 912 to prevent metal to metal contact and provide a somewhat resilient stopping surface. In addition, a block of foam rubber 940 may be placed and secured over the lining material to keep dirt out and provide damping. Optionally, locking holes may be provided in the kingpin and axle support plates, so that a locking pin may be installed to lock out any rocker movement in special applications, e.g., where the floor has many depressions or hollows but not bumps.

Figure 34:
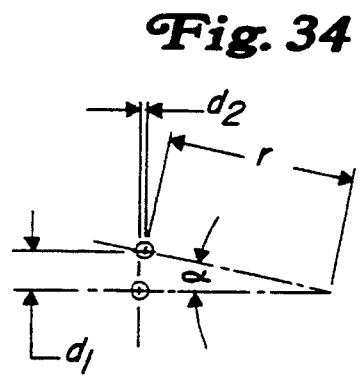
FIG. 34 is an enlarged schematic drawing of a section of FIG. 33 further illustrating operation of the rocker suspension.

In operation, as the dolly rolls across a smooth floor, the rocker suspension 900 remains balanced, with the rockers 926 horizontal, as shown in solid lines in FIG. 33. When one of the tandem wheels encounters a small obstruction (e.g., a crack in the floor, or debris such as paper, tape, etc. left on the floor), the, e.g., left wheel is forced upwardly. Correspondingly, the left axle support plate 900 is driven upwardly, while at the same time the right axle support plate is urged downwardly. However, as shown in FIGS. 33 and 34, due to the rocker geometry, the tandem wheels stay parallel to each other. In addition, the vertical displacement of the kingpin is reduced by half. For example, if the left wheel rolls over a ⅛-inch obstruction, the kingpin 902 moves upwardly by only 1/16 of an inch, in contrast to the embodiment of FIG. 5 wherein vertical movement of the kingpin would be equal to the height of the obstruction. Movement of the rockers and plates 912 is limited by the back surface of the plate 922 stopping against the flat sides of the kingpin 902.

In addition, horizontal forces generated by rolling over obstructions on the floor are minimized by the rocker suspension 900. As illustrated in FIG. 34, when a bump is encountered, the axle support plate 912 moves upwardly along circumferrence R. The vertical displacement d1 of the axle support plate 912 varies with the sine function, whereas the horizontal movement d2 varies as a cosine function (d2=r−r cosine α). Consequently, horizontal forces on the camera dolly are advantageously reduced. Where the r (radius) value is large compared to α, the d1 dimension is significantly larger than the d2 dimension.

Referring back to FIG. 31, a shroud 954 is attached to the lower leg frame 140. The shroud is preferably tubular with a slight conical taper. A disk 950 is attached to the kingpin 902 with set screws, at a position immediately below the shroud 954. The disk 950 has a dome 952 protruding from its lower surface. The shroud 954, disk 950 and dome 952 are provided to help avoid the possibility of cables draping downwardly from a camera supported on the dolly, from snagging around the kingpin. In the embodiment shown, for example, in FIG. 3, camera cables can potentially snag in and around the kingpin 118, kingpin ferrule 133 or the vertical sections of the lower leg frame 140. The shroud 954 and disk 950 fill in the spaces around the kingpin and lower leg frame 140 so that camera cables will not inadvertently snag on the camera dolly. The dome 952 projects downwardly on the kingpin 902 facing the contoured sections of the wheels, and leaving only a very small amount of open space, large enough, however, to allow for rocker movement but not enough to allow for cable snagging.

Figure 35:
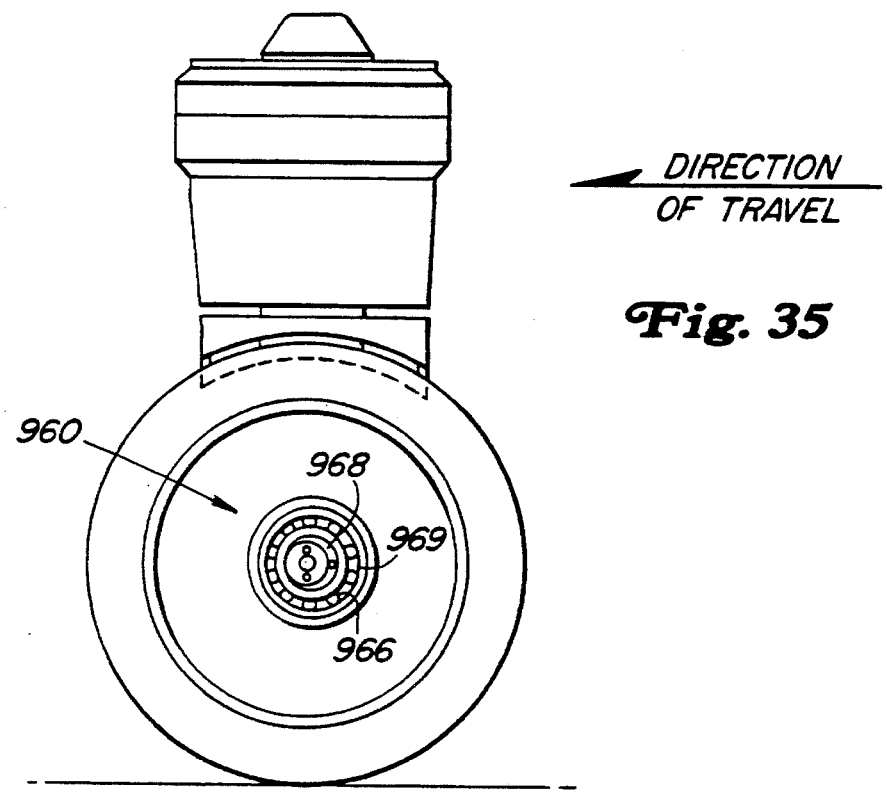
FIG. 35 is a side elevation in view in part section of a bogey wheel system.

Turning to FIGS. 35, 36 and 37, a bogey wheel system 960 is provided to work with the rocker suspension 968. As shown in FIG. 36, the bogey wheel system 960 includes an axle support plate 962, which may be similar or identical to the axle support plate 912 shown in FIG. 32, but further including two cap holes 964 on opposite sides of the axle center hole 963, and having an offset axle as further described below.

A wheel bearing 966 is similar to the bearing 901 (shown in FIG. 31), but preferably includes a larger inside diameter or bore. A cam 968 having a cam lobe 969 is slidably and rotatably installed onto the axle extending from the axle support plate 962, with the bearing 966 supported on and around the cam 968. A cam drive hole 970 extends into the cam 968.

An axle cap 972 has a center hole 974. As shown in FIG. 37, cap pins 976 extend from the inside face of the axle cap 972, off opposite sides of the center hole 974. A cam pin 978, significantly longer than the cap pins 976 also extends from the inner face of the axle cap 972. The cap pins 976 have rounded ends and are configured to slidably engage into the cap holes 964 in the axle.

Referring to FIGS. 35 and 36, a center bolt 980 passes through the center hole 974 in the axle cap 972 and threads into the axle center hole 963, to secure the axle cap 972, cam 968, and the bearing 966 onto the axle (with the cap pins 976 sliding into the cap holes 964 and the cam pin 978 sliding into the cam drive hole 970), such that the axle cap 972 is clamped against the end of the axle. For illustration purposes only, the hub and wheel shown in FIG. 35 is omitted from FIG. 36.

With reference to FIG. 32, if the rocker suspension is used without the bogey wheel system 960, the axles 914 and 915 are preferably located on the centerline 909 of each axle support plate which in turn are centrally positioned on the kingpin 902. The axles 914 and 915 are then laterally (in the front to back direction) aligned with each other, as are the wheels. On the other hand, in the preferred embodiment, where the bogey wheel system 960 is used with the rocker suspension 900, the axles 914 and 915 are oppositely offset from the aligned centerlines of the axle support plates by a dimension "c" preferably equal to the dimension of the cam lobe 969, e.g., 0.062 inch. (The direction of the mutual offset can be with either side leading.)

Figure 38:
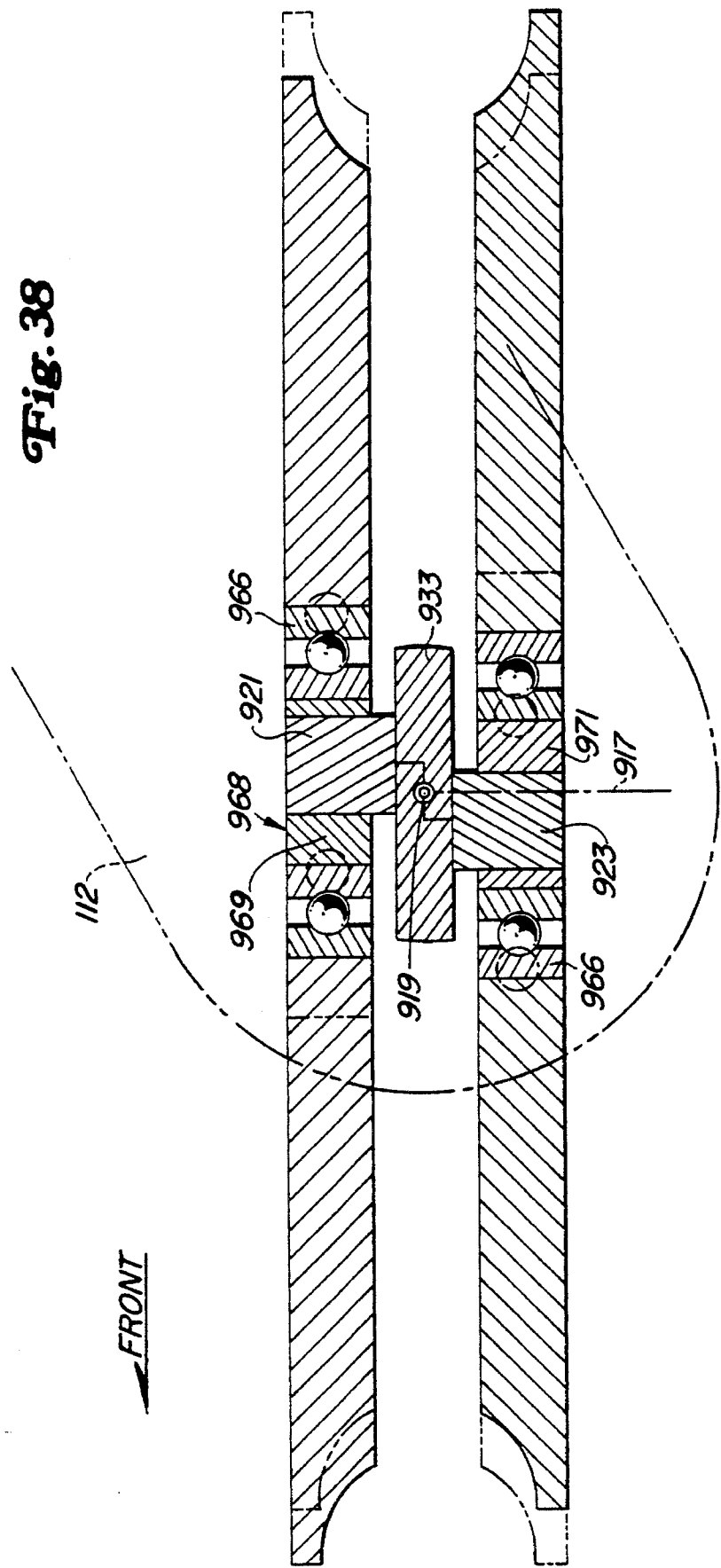
FIG. 38 is a diagrammatic top view of a dual wheel set showing operation of the bogey wheel system.

FIG. 38 illustrates the operation of the present wheel bogey system, used with or without a rocker suspension. With the inside axle 921 offset by, e.g., 0.062 inch to the rear on the kingpin 933, the inside wheel would ordinarily be positioned 0.062 inch behind of the kingpin centerline. However, with the inside cam lobe 969 positioned to the front on the axle 921, and a bearing 966 positioned around the cam 968, the inside wheel remains on the kingpin and nominal rotation centerline 917.

Similarly, even though the outside axle 923 is offset to the front of the kingpin 933 with the outside cam lobe 971 positioned to the rear, the outside wheel remains on the kingpin centerline 917. The kingpin centerline 917 passes through the center of rotation of the kingpin 919. The inside and outside axles are preferably offset by twice the cam lobe height. When the inside and outside cams are turned 180°, the cam lobes add to rather than negate the offset of the axles, and the wheels then have a maximum offset, as shown in phantom lines in FIG. 38, of 4 times the cam height. While FIG. 38 shows an embodiment with offset axles attached directly to the kingpin, the same configuration and geometry can be used with an embodiment having axles offset on axle support plates linked to the kingpin by rockers, as shown in FIG. 31. Of course, the amount of offset can be varied with different applications, a 0.062 inch cam lobe height and 0.125 axle offset being typical of one example.

In use, the dolly will often encounter a crack or other obstruction perpendicularly, i.e., both wheels of the dual wheel set will roll over the crack at the same time. In this circumstance, the advantage of the rocker suspension 900 is negated, as both wheels necessarily move up or down over the obstruction together thereby preventing any rocker movement. In addition, the dolly may be used on dolly track when movement over an irregular surface (e.g., unpaved ground, sand, etc.) is required. Small gaps or misalignments may be present at the joints between track sections. The rocker suspension 900 by itself, is similarly not effective at smoothing out bumps between track sections, as both wheels of the dual wheel set pair roll over the joint at the same time.

The bogey wheel system 960 allows the wheels to be offset from each other in the direction of travel, thereby allowing the rocker suspension 900 to effectively operate even on track joints and perpendicular crossings of floor cracks, etc. The bogey wheel system 960 is preferably provided on the inside and outside wheels of each of the four dual wheel sets of the dolly.

As best shown in FIG. 36, to engage the bogey wheel system 960 (for example on the outside wheel of the dual wheel set), the center bolt 980 is loosened and the axle cap 972 pulled outwardly until the cap pins 976 are withdrawn from the cap holes 964. The axle cap 972 is then rotated 180 degrees until the cap pins 976 once again align with the cap holes 964. The cam pin 978, being substantially longer than the cap pins 976 remains engaged into the cam drive hole 970. Consequently, the cam 968 turns with the axle cap 972 such that the cam lobe is moved to the front of the axle. The bearing 966 and wheel, which are supported on the cam 968 necessarily shift forward by twice the amount of the cam height or offset (i.e., from offset to the rear to offset to the front). The cap pins 976 are reinserted into the cap holes 964 and the center bolt 980 tightened to hold the axle cap 972, cam 968, bearing 966 and wheel into position on the axle.

If this same procedure is performed on the inside wheel, the cam is turned 180° from the front to the back of the axle, and the inside wheel is shifted by twice the cam height to the rear. Hence, the outside wheel is offset in the direction of travel from the inside wheel by four times the height of the cam lobe as shown in FIG. 38. Preferably, this procedure is used on all four of the dual wheels sets. Consequently, as the dolly moves forward and encounters a crack perpendicularly, the outside wheel will ride over the crack first, followed by the inside wheel. Since the wheels do not ride over the crack simultaneously, the rocker suspension 900 operates effectively, as described above.

With a 0.062 inch cam height, the wheel separation will be 0.250 inch. This separation should be sufficient for most applications.

In principle, the bogey wheel system 960, as shown in FIG. 36, could be provided on only one wheel of the pair, e.g., on the outside wheel. Then, the wheel position would be shifted only by twice the height of the cam lobe, as the cam is turned 180°. On the other hand, with the bogey wheel system 960 on both wheels, as preferred, a smaller offset can be achieved by engaging or turning only the inner or outer axle cap from its nominal position. If larger offset are desired between the wheels, the cam 968 can be provided by a higher cam lobe and a larger wheel bearing used.

Figure 39:
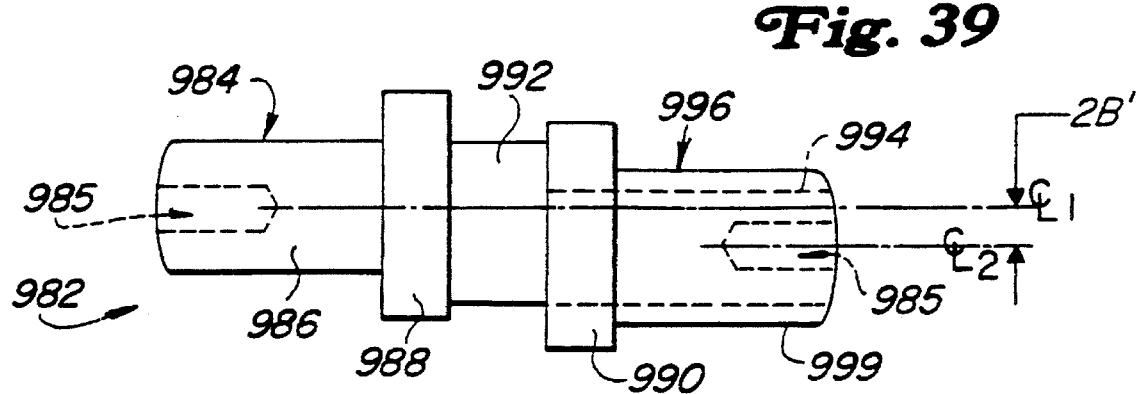
FIG. 39 is a plan view of an axle rocker/bogie wheel suspension system.
Figure 40:
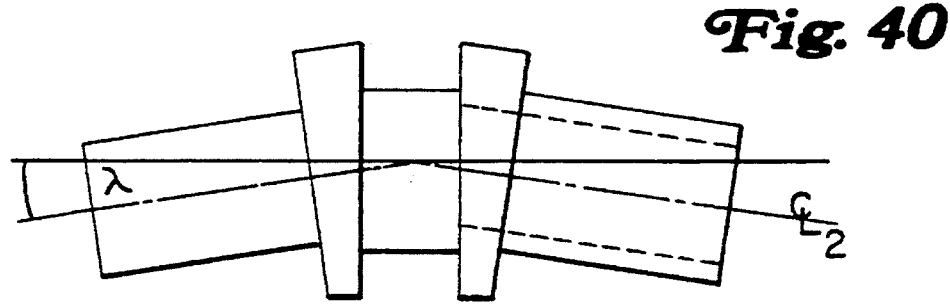
FIG. 40 is a side view thereof.
Figure 41:
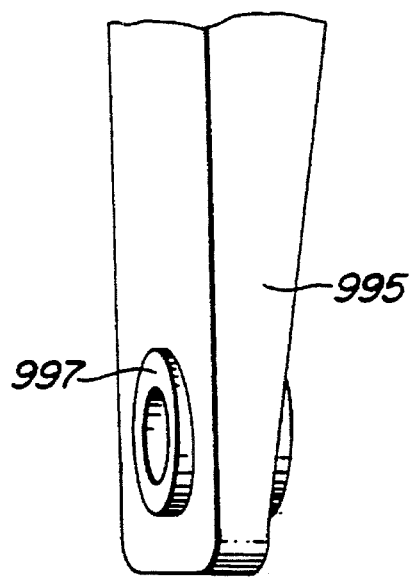
FIG. 41 is a perspective view fragment of a kingpin for use with the axle rocker/bogie shown in FIG. 39.

FIGS. 39–41 show an alternative axle rocker/bogey wheel suspension system 982. Referring to FIG. 39, the axle rocker/bogey suspension 982 includes an offset shaft 984 having threaded bores 985 at each end. The first end of the offset shaft 984 forms a first axle 986. A shoulder 988 separates the first axle 986 from a bearing shaft 992. The centerline of the bearing shaft 992 is offset from the centerline of the axle 986 by an offset dimension B'. The offset shaft 984 includes an offset axle section 994 (shown in phantom in FIG. 39) which has a centerline offset from the centerline of the bearing shaft 992 also by an offset dimension B'. Thus, the centerline of the offset axle section 994 is displaced or offset from the centerline of the first axle 986 by an offset of 2 B'. The offset axle section 994 is preferably threaded. A shoulder axle 996 includes a shoulder 990 and a second axle 999, and can be threaded onto the offset axle section 994. Alternatively, the shoulder axle 996 can be pressed onto the offset axle section 994.

Referring to FIG. 40, the first axle 986 and the second axle 999 decline at an angle λ from horizontal. The angle λ may range from 2°–10° and is preferably 4°. Turning to FIG. 41, the kingpin 995 has angled sides such as kingpin 902 but includes a bearing 997 having flat vertical ends. The offset shaft 984 (without the shoulder axle) is installed on the kingpin 995 by extending the offset axle section 994 through the bearing 997, with the bearing shaft 992 coming to rest within the bearing 997, and the shoulder 988 resting against the flat vertical first side of the bearing 997. The shoulder axle 996 is then threaded onto the offset axle section 994 extending outwardly from the bearing 997, with the shoulder 990 clamped against the opposite or second flat vertical side of the bearing 997. Cams, wheel bearings, wheels and axle caps (as shown in FIGS. 36 and 37) can then be installed over the first axle 986 and second axle 999.

In operation, the offset centerlines between the first and second axles, as shown in FIG. 39, allow the axle rocker/bogey suspension system 982 to provide a rocker movement. When the leading wheel encounters a bump, the leading axle pivots or rotates upwardly, and correspondingly, the lagging axle pivots downwardly about the bearing 997, to provide a rocker action. The cams installed over the first and second axles, such as the cam shown in FIG. 36, can be turned to set the bogey offset of the wheels from 0 to a maximum offset determined by the B' dimension and the cam height (preferably 0.12 inch each).

In theory, "perfect" dolly steering geometry contemplates that the inside and outside wheel of the dual set should be aligned (laterally) with each other in the direction of travel. Accordingly, in principle, the front to back wheel offset provided by the bogey wheel system 960 introduces imperfection to the steering geometry of the dolly, with increasing shift causing increasing imperfection. The imperfect steering geometry may increase rolling resistance; add resistance to steering; cause wheel scrubbing, etc.

However, the offset introduced by the bogey wheel system is small enough to maintain good steering geometry, yet large enough to allow the rocker suspension 900 to effectively operate over a much broader range of floor and track conditions. For certain applications, the bogey wheel system 960 may be left engaged over a relatively long term. In other applications, the bogey wheel system 960 may be engaged only for a specific camera shot or other use and then disengaged to return to "perfect" steering geometry. In either event, the bogey wheel system 960 can be quickly and conveniently engaged and disengaged merely by loosening the center bolt 980 and turning the axle cap 972.

To reduce wheel scrubbing or squawking, rubber tires filled with 2–51% silicone, and preferably 3% silicone are used. These tires, available from Peterson Systems International, Duarte, Calif., have built-in lubrication to reduce friction. Hence, the tire offset or bogey can be increased without unduly increasing scrubbing due to imperfect steering geometry.

Thus, while several embodiments have been shown and described, it will be apparent to those skilled in the art that various modifications and additions can be made without departing from the spirit and scope of the invention.

I claim:

1. A suspension system for a camera dolly comprising:

a kingpin attached to the dolly and having a first side and a second side, with the first side of the kingpin and the second side of the kingpin inclined away from each other at an angle;

a first axle support plate having a first axle and a second axle support plate having a second axle with the first and second axle support plates each having a flat upper section joined at an angle to a lower section;

a pair of upper rockers and a pair of lower rockers, the upper and lower rockers pivotally attached to the upper and lower sections of the first and second axle support plates, respectively, at spaced apart upper and lower attachment points, with the upper attachment points on the upper section vertically aligned with the lower attachment points on the lower section, the upper and lower rockers attached to the kingpin with the first axle support plate adjacent to the first side of the kingpin and with the second axle support plate adjacent to the second side of the kingpin and with the spacing between the upper attachment points equal to the spacing between the lower attachment points.

2. The suspension system of claim 1 wherein the first side of the kingpin and the second side of the kingpin are inclined away from each other at an angle of approximately 2°–6°.

3. The suspension system of claim 1 further comprising a non-metal lining material attached to at least one of the first and second sides of the kingpin.

4. The suspension system of claim 1 wherein the first axle is perpendicular to the first axle support plate and the second axle is perpendicular to the second axle support plate.

5. The suspension system of claim 1 wherein the first axle support plate is spaced apart from the first side of the kingpin by from 0.04–0.25 inches, when the rockers are horizontal.

6. The suspension system of claim 1 further comprising a cam on at least one of the first and second axles, a wheel bearing supported over the cam, and a wheel supported on the wheel bearing.

7. A camera dolly comprising:

a kingpin;

an axle support plate on the kingpin;

an axle extending from the support plate;

a cam pivotally mounted on the axle;

a wheel bearing supported on the cam;

a dolly wheel around the wheel bearing; and an axle cap having a cap pin and a cam pin for engaging into a cap pin hole in the axle and a cam drive hole in the cam, respectively.

8. The camera dolly of claim 7 further comprising a center bolt extending through the axle cap to hold the cap onto the axle.

9. A camera dolly comprising:

a kingpin having a first axle extending from a first side, and a second axle extending from a second side opposite the first side, and with the first axle longitudinally offset from the second axle;

a first cam on the first axle and a second cam on the second axle, wherein the first and second cams each have a cam lobe having a height equal to approximately one-half of the amount of offset of the first and second axles;

a first wheel bearing supported on the first cam and a second wheel bearing supported on the second cam; and a first wheel supported on the first wheel bearing and a second wheel supported on the second wheel bearing.

* * * * *